(12) United States Patent
Kamata

(10) Patent No.: US 11,184,559 B2
(45) Date of Patent: Nov. 23, 2021

(54) IMAGE PROCESSING DEVICE, IMAGE PROCESSING METHOD, AND IMAGING DEVICE

(71) Applicant: SONY CORPORATION, Tokyo (JP)

(72) Inventor: Masato Kamata, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/633,689

(22) PCT Filed: Jul. 26, 2018

(86) PCT No.: PCT/JP2018/028029
§ 371 (c)(1),
(2) Date: Jan. 24, 2020

(87) PCT Pub. No.: WO2019/026746
PCT Pub. Date: Feb. 7, 2019

(65) Prior Publication Data
US 2020/0213529 A1 Jul. 2, 2020

(30) Foreign Application Priority Data
Aug. 2, 2017 (JP) .............................. JP2017-149652

(51) Int. Cl.
H04N 5/265 (2006.01)
H04N 5/235 (2006.01)
H04N 5/262 (2006.01)

(52) U.S. Cl.
CPC ........... H04N 5/265 (2013.01); H04N 5/2352 (2013.01); H04N 5/2621 (2013.01)

(58) Field of Classification Search
CPC .... H04N 5/265; H04N 5/2352; H04N 5/2621; H04N 5/23229; H04N 5/232933;
(Continued)

(56) References Cited

U.S. PATENT DOCUMENTS 8,711,248 B2 * 4/2014 Jandhyala ................. G06T 7/20
348/239
8,902,335 B2 * 12/2014 Doepke .............. H04N 5/23258
348/239
(Continued)

FOREIGN PATENT DOCUMENTS

CN 101641963 A 2/2010
CN 102215337 A 10/2011
(Continued)

OTHER PUBLICATIONS

Extended European Search Report of EP Application No. 18841886.7, dated May 4, 2020, 09 pages of EESR.
(Continued)

Primary Examiner — Pritham D Prabhakher
(74) Attorney, Agent, or Firm — Chip Law Group

(57) ABSTRACT

The present technology relates to an image processing device and method, an imaging device and a program capable of enhancing convenience in use. The image processing device includes a display controlling section that causes, while taking, as cutout images, regions different from each other in a plurality of images for synthesis whose imaging conditions are different from each other, a boundary line, which relates to a blend process to be performed when a plurality of cutout images is synthesized to generate a recording image, to be displayed and causes the displaying of at least one boundary line from among a plurality of boundary lines to be changed in response to an operation by a user. The present technology can be applied to a digital still camera.

28 Claims, 14 Drawing Sheets

(58) Field of Classification Search
CPC ........... H04N 5/2355; H04N 5/232935; H04N 5/232945; H04N 5/23216; H04N 5/23248
USPC ........................................................ 348/239
See application file for complete search history.

(56) References Cited

U.S. PATENT DOCUMENTS

| | | | | |
|---|---|---|---|---|
| 9,185,284 | B2* | 11/2015 | Chao | H04N 5/23216 |
| 9,264,611 | B2* | 2/2016 | Abe | H04N 5/2354 |
| 9,781,393 | B2* | 10/2017 | Kudo | H04N 5/2356 |
| 9,824,426 | B2* | 11/2017 | Wu | G06T 5/002 |
| 10,019,639 | B2* | 7/2018 | Vandeweerd | G06T 1/0021 |
| 10,068,373 | B2* | 9/2018 | Lee | G06F 3/04815 |
| 10,250,819 | B2* | 4/2019 | Hosono | H04N 5/23212 |
| 2012/0028233 | A1* | 2/2012 | Williams | B21D 39/02 434/428 |
| 2012/0120277 | A1 | 5/2012 | Tsai | |
| 2012/0218442 | A1* | 8/2012 | Jandhyala | G06T 5/50 348/239 |
| 2013/0002906 | A1 | 1/2013 | Ueda et al. | |
| 2013/0033612 | A1 | 2/2013 | Wu et al. | |
| 2013/0329071 | A1* | 12/2013 | Doepke | G06T 3/4038 348/222.1 |
| 2014/0028792 | A1* | 1/2014 | Abe | H04N 5/23274 348/37 |
| 2015/0244915 | A1 | 8/2015 | Kikuchi | |
| 2015/0281594 | A1* | 10/2015 | Sakaniwa | H04N 5/265 348/218.1 |
| 2015/0304546 | A1* | 10/2015 | Izawa | H04N 5/232122 348/229.1 |
| 2016/0005229 | A1* | 1/2016 | Lee | G06F 3/0488 345/419 |
| 2016/0112644 | A1 | 4/2016 | Nishi | |
| 2016/0286189 | A1 | 9/2016 | Kudo et al. | |
| 2017/0064203 | A1 | 3/2017 | Kikuta | |
| 2017/0186202 | A1 | 6/2017 | Kikuta | |
| 2017/0300769 | A1* | 10/2017 | Vandeweerd | H04N 1/32277 |
| 2017/0359524 | A1* | 12/2017 | Hosono | H04N 9/8205 |

FOREIGN PATENT DOCUMENTS

| | | |
|---|---|---|
| CN | 102833479 A | 12/2012 |
| CN | 102917167 A | 2/2013 |
| CN | 104937924 A | 9/2015 |
| CN | 104994288 A | 10/2015 |
| CN | 105959534 A | 9/2016 |
| CN | 106027918 A | 10/2016 |
| CN | 110086980 A | 8/2019 |
| EP | 3007434 A1 | 4/2016 |
| JP | 2009-290635 A | 12/2009 |
| JP | 2011-188277 A | 9/2011 |
| JP | 2015-126299 A | 7/2015 |
| JP | 6446790 B2 | 9/2015 |
| JP | 5903658 B2 | 4/2016 |
| JP | 2017-050857 A | 3/2017 |
| JP | 2017-117334 A | 6/2017 |
| WO | 2014/192152 A1 | 12/2014 |

OTHER PUBLICATIONS

Office Action for CN Patent Application No. 201880048379.X dated Jan. 25, 2021, 7 pages of Office Action and 7 pages of English Translation.

International Search Report and Written Opinion of PCT Application No. PCT/JP2018/028029, dated Oct. 30, 2018, 17 pages of ISRWO.

* cited by examiner

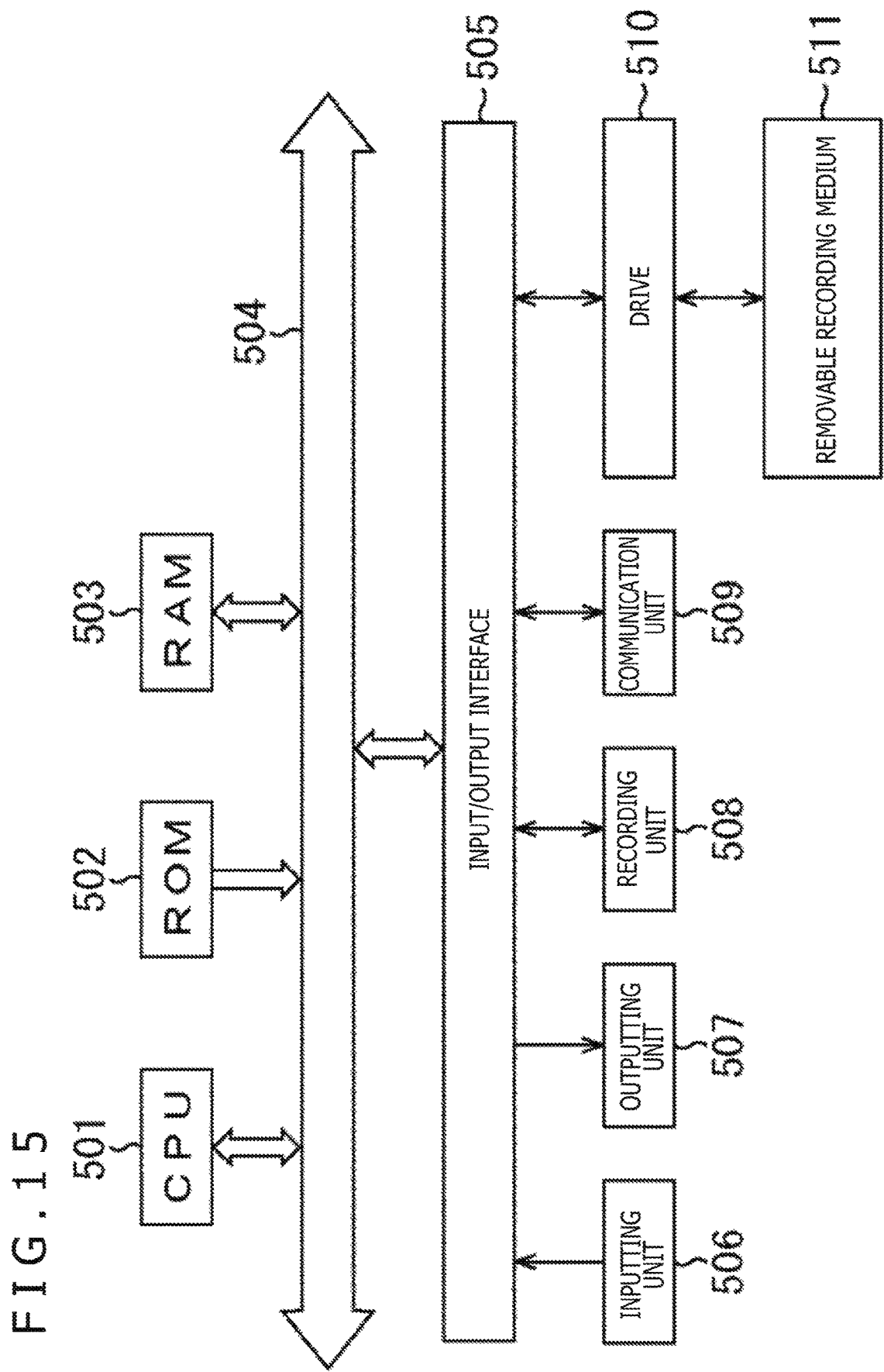

IMAGE PROCESSING DEVICE, IMAGE PROCESSING METHOD, AND IMAGING DEVICE

CROSS REFERENCE TO RELATED APPLICATIONS

This application is a U.S. National Phase of International Patent Application No. PCT/JP2018/028029 filed on Jul. 26, 2018, which claims priority benefit of Japanese Patent Application No. JP 2017-149652 filed in the Japan Patent Office on Aug. 2, 2017. Each of the above-referenced applications is hereby incorporated herein by reference in its entirety.

TECHNICAL FIELD

The present technology relates to an image processing device and method, an imaging device and a program, and particularly to an image processing device and method, an imaging device and a program capable of improving convenience in use.

BACKGROUND ART

Conventionally, HDR (High Dynamic Range) is known as a technology relating to capture of a still image. If the HDR is used, then whiteout or black crush can be suppressed and a high-quality image having a wide dynamic range can be obtained.

For example, as a technology relating to the HDR, a technology is proposed in which, by performing image synthesis taking a moving body into consideration, generation of an afterimage or discontinuities can be suppressed and a natural synthesis image can be obtained (for example, refer to PTL 1).

CITATION LIST

Patent Literature

[PTL 1]
JP 2011-188277 A

SUMMARY

Technical Problem

Also a technology is available by which, in the HDR, a display screen image on which a through image is displayed upon imaging is divided into several regions such that setting of exposure or the like can be performed for each of the divisional regions.

However, according to this technology, division of a region, setting for each region, and so forth are cumbersome, and convenience in use of the technology is not good.

For example, if a camera is inclined after division of a region is performed on a display screen image, then an imaging object displayed on the display screen image is inclined, resulting in change in a positional relationship between the divisional regions on the display screen image and the imaging object. Therefore, it is necessary for an imaging person to perform an operation for division of a region and so forth again, which is cumbersome.

The present technology has been made in view of such a situation as described above and makes it possible to improve convenience in use.

Solution to Problem

An image processing device of a first aspect of the present disclosure includes a display controlling unit that causes, while taking, as cutout images, regions different from each other in a plurality of images for synthesis whose imaging conditions are different from each other, a boundary line, which relates to a blend process to be performed when a plurality of the cutout images is synthesized to generate a recording image, to be displayed and causes the displaying of at least one of the boundary lines from among a plurality of the boundary lines to be changed in response to an operation by a user.

An image processing method or a program of the first aspect of the present technology includes the step of causing, while taking, as cutout images, regions different from each other in a plurality of images for synthesis whose imaging conditions are different from each other, a boundary line, which relates to a blend process to be performed when a plurality of the cutout images is synthesized to generate a recording image, to be displayed and causing the displaying of at least one of the boundary lines from among a plurality of the boundary lines to be changed in response to an operation by a user.

In the first aspect of the present technology, taking, as cutout images, regions different from each other in a plurality of images for synthesis whose imaging conditions are different from each other, a boundary line, which relates to a blend process to be performed when a plurality of the cutout images is synthesized to generate a recording image, is displayed, and the displaying of at least one of the boundary lines from among a plurality of the boundary lines is changed in response to an operation by a user.

An imaging device of a second aspect of the present technology includes a display controlling unit that changes overlapping display information to be displayed in an overlapping relationship with an image captured through an imaging lens of the imaging device, on the basis of at least one of focal length information indicative of a focal length of the imaging lens and detection angle information indicative of a rotation angle of the imaging device.

An imaging processing method or a program of the second aspect of the present technology includes the step of changing overlapping display information to be displayed in an overlapping relationship with an image captured through an imaging lens of an imaging device, on the basis of at least one of focal length information indicative of a focal length of the imaging lens and detection angle information indicative of a rotation angle of the imaging device.

In the second aspect of the present technology, overlapping display information to be displayed in an overlapping relationship with an image captured through an imaging lens of an imaging device is changed on the basis of at least one of focal length information indicative of a focal length of the imaging lens and detection angle information indicative of a rotation angle of the imaging device.

Advantageous Effect of Invention

With the first aspect and the second aspect of the present technology, convenience in use can be improved.

It is to be noted that the effect described here is not necessarily limited and any effect described in the present disclosure may be applicable.

BRIEF DESCRIPTION OF DRAWINGS

FIG. 15 is a view depicting an example of a configuration of a computer.

DESCRIPTION OF EMBODIMENTS

In the following, embodiments to which the present technology is applied are described with reference to the drawings.

First Embodiment

<Example of Configuration of Imaging Device>

The present technology automatically corrects, without an operation by a user, in a case where a region of an image is divided into several regions on a display screen image and setting relating to imaging is performed for each of the regions, a boundary between divisional regions in response to a change of an orientation (inclination) of a camera. This can improve convenience in use.

Such present technology as just described can be applied to various electronic apparatuses having an imaging function such as a digital still camera, a digital video camera or a portable telephone set. In the following, description is continued taking, as an example, a case in which the present technology is applied to a digital still camera.

Figure 1:
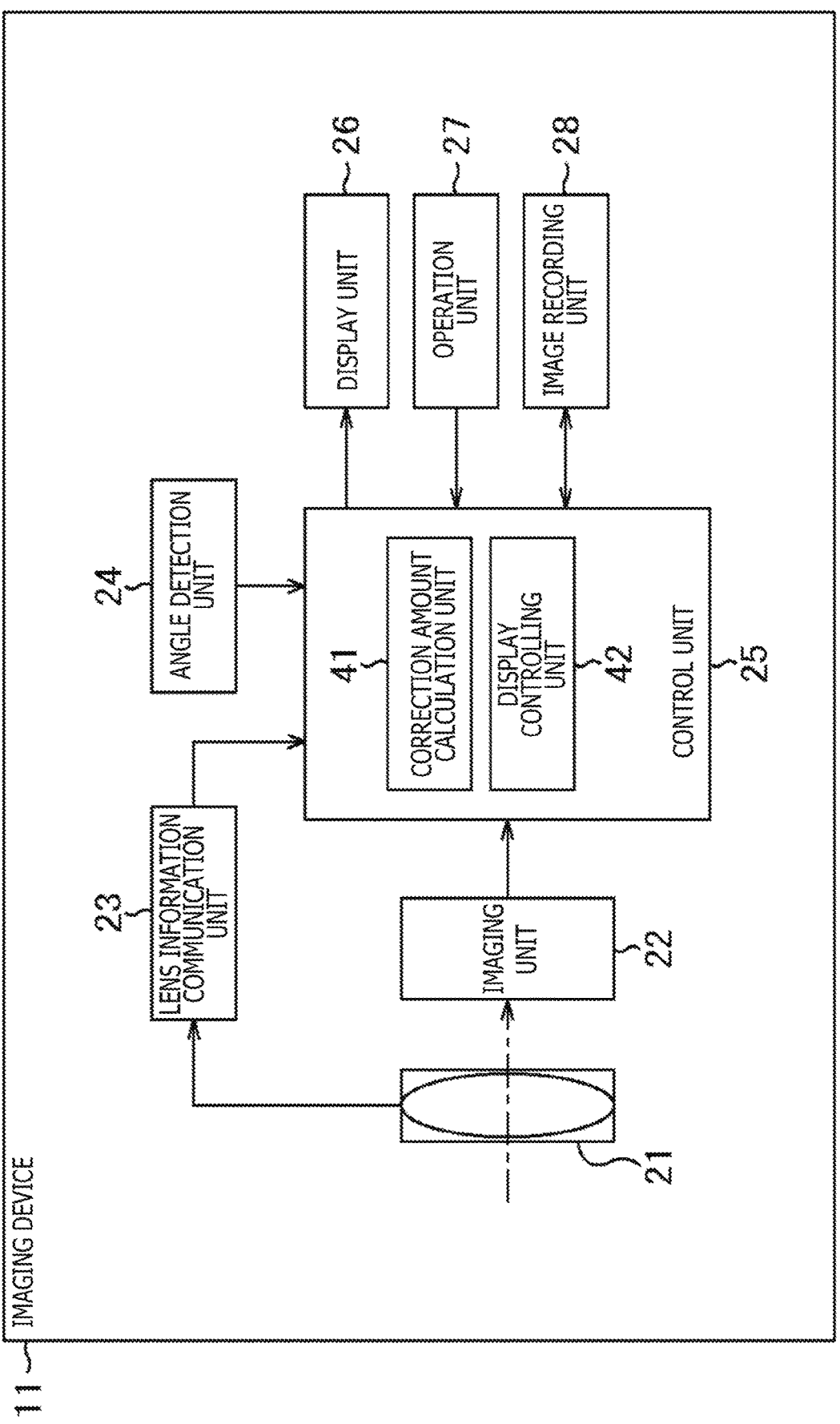
FIG. 1 is a view depicting an example of a configuration of an imaging device.

FIG. 1 is a view depicting an example of a configuration of an embodiment of an imaging device to which the present technology is applied.

An imaging device 11 depicted in FIG. 1 includes a digital still camera and is an image processing device that performs HDR imaging to acquire a still image or a moving image. It is to be noted that, although an image captured by the imaging device 11 may be a still image or a moving image, the following description is given assuming that the image finally recorded is a still image.

The imaging device 11 includes an imaging lens 21, an imaging unit 22, a lens information communication unit 23, an angle detection unit 24, a control unit 25, a display unit 26, an operation unit 27, and an image recording unit 28.

The imaging lens 21 includes, for example, one or a plurality of optical lenses and an aperture, a memory for retaining various data relating to the imaging lens 21, and a communication unit for transmitting and receiving information relating to the imaging lens 21 to and from the lens information communication unit 23, and condenses and introduces light incident from an imaging object to the imaging unit 22.

It is to be noted that the imaging lens 21 may be an interchangeable lens that can be attached removably to the imaging device 11 or may be a lens provided integrally on the imaging device 11.

Further, although the imaging lens 21 may be a zoom lens having a changeable focal length or may be a single focus lens having a fixed focal length, it is assumed here that the imaging lens 21 is a zoom lens.

The imaging unit 22 includes, for example, an image sensor, and images an imaging object by receiving and photoelectrically converting light incident from the imaging object through the imaging lens 21 and supplies a captured image obtained as a result of imaging to the control unit 25.

The lens information communication unit 23 communicates with the imaging lens 21 to acquire information relating to the imaging lens 21. In particular, the lens information communication unit 23 acquires, as the information relating to the imaging lens 21, focal length information indicative of a focal length of the imaging lens 21 from the imaging lens 21 and supplies the focal length information to the control unit 25, for example.

The angle detection unit 24 includes, for example, an angle detection sensor such as a gyro sensor, detects an inclination (rotation) of the imaging device 11, and supplies a result of the detection to the control unit 25.

Here, an angle of rotation especially when the imaging device 11 is rotated around an optical axis of the imaging lens 21 is also referred to as rotation angle. Further, an angle of rotation when the imaging device 11 is rotated in a swinging manner in the vertical direction, i.e., an upward or downward direction, around a straight line perpendicular to the optical axis of the imaging lens 21 is also referred to as inclination angle. Although the rotation angle and the inclination angle are given around the axes of rotation that are different from each other, both of them are information indicative of a rotation angle when the imaging device 11 is rotated from a position made a reference.

The angle detection unit 24 detects the rotation angle and the inclination angle as inclinations of the imaging device 11 and supplies detection angle information indicative of a result of the detection to the control unit 25.

The control unit 25 controls operation of the entire imaging device 11. For example, the control unit 25 generates a through image on the basis of a captured image supplied from the imaging unit 22 and supplies the through image to the display unit 26 or generates a recording image on the basis of the captured image and supplies the generated recording image to the image recording unit 28.

Here, the through image is an image that is used for confirmation for confirming a composition, brightness, and so forth of an image to be captured, the image being displayed on the display unit 26 during a period until a shutter button is depressed by an imaging person to instruct the imaging device to perform imaging after fetching (imaging) of a captured image is started.

Further, the recording image is an image for recording that is imaged (recorded), when the shutter button is depressed by a user who is the imaging person to instruct the imaging device to perform imaging, in response to the instruction.

More particularly, the recording image is a synthetic image obtained by synthesizing a plurality of images by HDR.

In the imaging device 11, a display screen image of the display unit 26, i.e., a through image, is divided into several regions, and imaging conditions such as an aperture value, an ISO sensitivity, WR (White Balance (white balance)), brightness (exposure correction value), a shutter speed, and so forth can be set for each of the regions obtained by the division (hereinafter also referred to as divisional regions).

If imaging is instructed by the imaging person, then imaging is performed in accordance with each of the imaging conditions set for each divisional region, and a captured image for each of the imaging conditions (hereinafter also referred to as image for synthesis) is obtained. Then, the imaging device 11 cuts out the images at a portion of the divisional regions in the images for synthesis captured in accordance with the imaging conditions corresponding to the divisional regions and synthesizes the images at the portions of the divisional regions to form a recording image that is one HDR synthetic image.

Further, the control unit 25 includes a correction amount calculation unit 41 and a display controlling unit 42.

The correction amount calculation unit 41 determines, on the basis of at least one of focal length information supplied from the lens information communication unit 23 and detection angle information supplied from the angle detection unit 24, and by calculation, correction information correcting a display position or an inclination of a boundary line between divisional regions to be displayed together with a through image on the display unit 26.

Although details are hereinafter described, on the imaging device 11, upon imaging, a boundary line between divisional regions is displayed together with a through image on the display unit 26.

At this time, if the imaging device 11 is inclined, i.e., if the imaging device 11 is rotated to change the inclination angle and the rotation angle, then the imaging device 11 changes the inclination and the display position of the boundary line on the display screen image of the display unit 26 in response to the change of the inclination and the rotation angle.

The correction amount calculation unit 41 determines, as correction information, information for correcting such inclination and position of a boundary line described above. It is to be noted that, although the correction information may be any information if it is information that allows display correction of a boundary line such as information indicative of a correction amount for a display position or an inclination of a boundary line, it is assumed here that information indicative of an inclination or a display position of a boundary line after display correction is determined as correction information.

The display controlling unit 42 controls display of various images on the display unit 26 such as display of a through image or a boundary line between divisional regions. For example, the display controlling unit 42 performs, on the basis of the correction information obtained by the correction amount calculation unit 41, display correction of a boundary line between divisional regions and so forth displayed in an overlapping relationship with a through image on. In other words, the display controlling unit 42 changes, on the basis of the correction information, display of a boundary line between divisional regions and so forth displayed in an overlapping relationship with a through image.

The display unit 26 includes, for example, a liquid crystal display panel, an organic EL (Electro Luminescence) display, or the like and displays an image supplied from the control unit 25 such as a through image. The operation unit 27 includes, for example, various buttons and switches such as a shutter button, as well as a wheel button, a cross key, a dial, a touch panel placed on the display unit 26, and so forth and supplies a signal according to an operation by a user to the control unit 25.

The image recording unit 28 records a recording image or the like supplied from the control unit 25 and supplies an image being recorded or the like to the control unit 25. It is to be noted that the image recording unit 28 may be mounted removably on the imaging device 11.

<Present Technology>

In a case where a recording image is obtained by HDR, the imaging device 11 generates a recording image by synthesizing images of divisional regions of a plurality of images for synthesis different from each other.

A user would designate a boundary between divisional regions in advance before depressing the shutter button as the operation unit 27 to instruct the imaging device to perform imaging.

Figure 2:
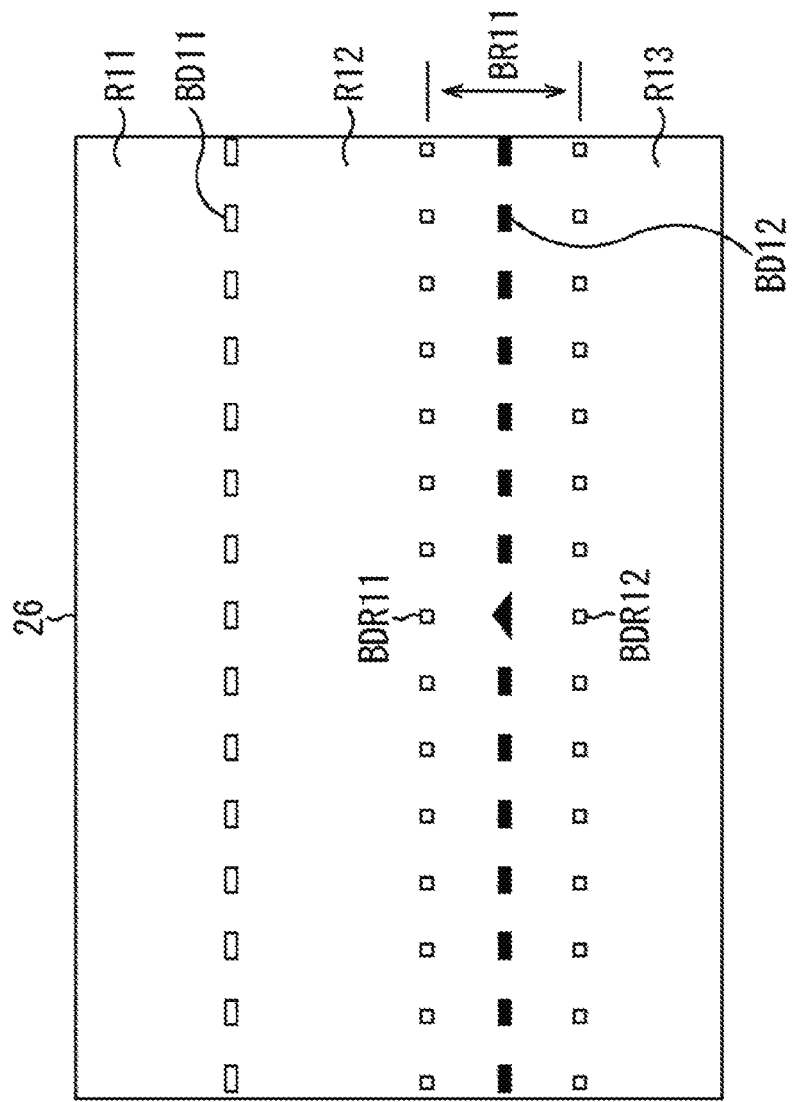
FIG. 2 is a view illustrating divisional regions.

For example, the user can arbitrarily designate a boundary line on a display screen image as depicted in FIG. 2 to divide the image into a plurality of regions.

In this example, a boundary line BD11 and another boundary line BD12 determined by the user are displayed on the display screen image of the display unit 26, and the display screen image is divided into three divisional regions R11 to R13 by these boundary lines. Here, the divisional region R11 is a region from an upper side end (upper end) of the display screen image to the boundary line BD11 in FIG. 2, the divisional region R12 is a region from the boundary line BD11 to the boundary line BD12, and the divisional region R13 is a region from the boundary line BD12 to a lower side end (lower end) of the display screen image in FIG. 2.

The user would determine the divisional regions R11 to R13 by operating the operation unit 27, for example, to move the boundary line BD11 or the boundary line BD12 in an upward or downward direction in FIG. 2 or to rotate the boundary line BD11 or the boundary line BD12 so as to have a given inclination.

In this case, the user can not only perform an operation for determining such boundary lines in a state in which a through image is displayed on the display unit 26 but can also perform an operation for determining a boundary line in a state in which a through-image is not displayed on the display unit 26.

For example, in a case where the user performs an operation for determining (designating) an inclination or a position of a boundary line in a state in which a through image is displayed, the user can, as an example, determine a position or an inclination of the boundary line BD11 such that the boundary between the sky and the ground displayed as a through image is overlapped with the boundary line BD11. By this, it is possible to determine the divisional region R11 as a region of the sky and determine the divisional region R12 as a region of the ground.

It is to be noted that, when the boundary line BD11 or the boundary line BD12 is to be designated, the boundary line BD11 and the boundary line BD12 may be moved or rotated simultaneously by an equal amount in response to an operation for the operation unit 27 by the user or the boundary line BD11 and the boundary line BD12 may be moved or rotated separately from (independently of) each other.

Further, although the boundary line BD11 and the boundary line BD12 here are straight lines extending in a horizontal direction, a boundary line may be any line such as a straight line extending in a vertical direction, a straight line extending in an oblique direction, or a curved line, and the number of boundary lines may be any number. In other words, the user can divide an image into any given number of divisional regions, and also the shape of each divisional region may be any shape.

Further, although details are hereinafter described, an imaging condition for each of the divisional regions R11 to R13 divided by each boundary line would also be designated by the user before imaging is instructed. Here, it is assumed that imaging conditions V11 to V13 are respectively determined for the divisional regions R11 to R13.

If the user depresses the shutter button as the operation unit 27 to instruct the imaging device 11 to perform imaging after the user operates the operation unit 27 to designate boundary lines, i.e., divisional regions, and imaging conditions for the individual divisional regions in this manner, then the imaging device 11 captures images for synthesis corresponding to the divisional regions R11 to R13.

In particular, the imaging device 11 determines a captured image obtained by performing imaging in accordance with the imaging condition V11 determined for the divisional region R11 as an image for synthesis G11, determines a captured image obtained by performing imaging in accordance with the imaging condition V12 determined for the divisional region R12 as an image for synthesis G12, and determines a captured image obtained by performing imaging in accordance with the imaging condition V13 determined for the divisional region R13 as an image for synthesis G13.

Then, the imaging device 11 generates a recording image on the basis of the images for synthesis G11 to G13 obtained in this manner and having imaging timings different from each other.

In particular, an image CG11 of a portion of a region corresponding to the divisional region R11 is cut out from the image for synthesis G11, and an image CG12 of a portion of a region corresponding to the divisional region R12 is cut out from the image for synthesis G12. Further, an image CG13 of a portion of a region corresponding to the divisional region R13 is cut out from the image for synthesis G13. These images CG11 to CG13 are images of regions different from each other.

Further, such images CG11 to CG13 are juxtaposed and synthesized such that they have a same positional relationship as that of the corresponding divisional regions R11 to R13 to form a single recording image. If it is made possible to determine an imaging condition for each region in this manner, then a recording image in which each region has appropriate brightness or hue can be obtained.

In the following description, an image of a portion of a region, which is cut out from an image for synthesis captured in accordance with an imaging condition determined for a divisional region and corresponds to the divisional region such as the images CG11 to CG13 is also referred to as the cutout image.

Further, although, upon image synthesis, cutout images corresponding to divisional regions adjacent to each other are synthesized so as to be joined to each other, since the imaging conditions of the cutout images may sometimes be different from each other, if the cutout images are simply joined, then a boundary portion between the cutout images may stand out.

Therefore, when cutout images are joined to each other, a blend process such as an alpha blend is performed for a region in the proximity of a boundary position between the cutout images, for example. In other words, smoothing is performed in the proximity of each boundary position.

When a user operates the operation unit 27 to perform an operation for designating the boundary line BD11 or the boundary line BD12, the user can designate a region that becomes a target of a blend process (such region is hereinafter also referred to as blend region).

For example, in the example depicted in FIG. 2, a region of a predetermined width centered at the boundary line BD12 is designated as a blend region BR11. Accordingly, it can also be said that the boundary line BD12 is a boundary line relating to a blend region that becomes a target of a blend process.

Here, a region, which includes the boundary line BD12, is between two straight lines BDR11 and BDR12, and is parallel to the boundary line BD12, is the blend region BR11. In other words, the straight line BDR11 and the straight line BDR12 make boundary lines indicative of the range of the blend region BR11.

Accordingly, more particularly, for example, the image CG13 corresponding to the divisional region R13 is an image of a region including the blend region BR11 in the image for synthesis G13, i.e., a region from the straight line BDR11 in the image for synthesis G13 to a lower end of the image for synthesis G13.

The user would operate the operation unit 27 to move the straight line BDR11 or the straight line BDR12 upwardly or downwardly to designate a distance (width) between the straight line BDR11 and the straight line BDR12 to thereby designate a region to be made the blend region BR11. It is to be noted that the straight line BDR11 and the straight line BDR12 may be moved in an interlocking relationship with each other in response to an operation of the operation unit 27 by the user or may be moved individually, i.e., independently of each other.

In this case, an image in a region corresponding to the blend region in the recording image is generated in the following manner.

In particular, for example, a pixel in a region corresponding to the blend region BR11 in the recording image is determined as a noticed pixel. Then, a pixel value of a pixel at a position same as that of the noticed pixel in the image for synthesis G12 (image CG12) and a pixel value of a pixel at a position same as that of the noticed pixel in the image for synthesis G13 (image CG13) are mixed (blended) at a predetermined mixture ratio, i.e., weighted-added, and a pixel value obtained as a result of the blend is determined as a pixel value of the noticed pixel.

At this time, the mixture ratio is determined such that, for example, it changes linearly or nonlinearly in response to the position of the noticed pixel. In particular, for example, when the noticed pixel is at a position corresponding to the position on the boundary line BD12, the mixture ratio is determined such that the contribution rates of the image for synthesis G12 and the image for synthesis G13 to the pixel value of the noticed pixel are equal to each other. In short, the mixture ratio of the pixel of the image for synthesis G12 and the mixture ratio of the pixel of the image for synthesis G13 are made equal to each other (for example, to 0.5).

Further, the mixture ratio is determined such that, for example, as the notice pixel is positioned nearer to a position corresponding to the position on the straight line BDR11, the contribution rate of the image for synthesis G12 increases linearly or nonlinearly. Similarly, the mixture ratio is determined such that, for example, as the noticed pixel is positioned nearer to a position corresponding to the position on the straight line BDR12, the contribution rate of the image for synthesis G13 increases linearly or nonlinearly.

The user can discretionally set a width of the straight line BDR11 and a rate of change of the mixture ratio that changes linearly or nonlinearly, i.e., the blur amount or the like by a blend process, by operating the operation unit 27. Similarly, the user can designate a width of the blend region, a rate of the change of the mixture ratio, and so forth also in regard to the blend region of the boundary line BD11.

It is to be noted that, when the width or the like of the blend region BR11 is changed, the width or the like of the blend region of the boundary line BD11 may also be changed simultaneously by an equal amount in an interlocking relationship or it may also be made possible to set the width of the blend region or the rate of the change of the mixture ratio individually for the blend region BR11 and the blend region of the boundary line BD11.

Figure 3:
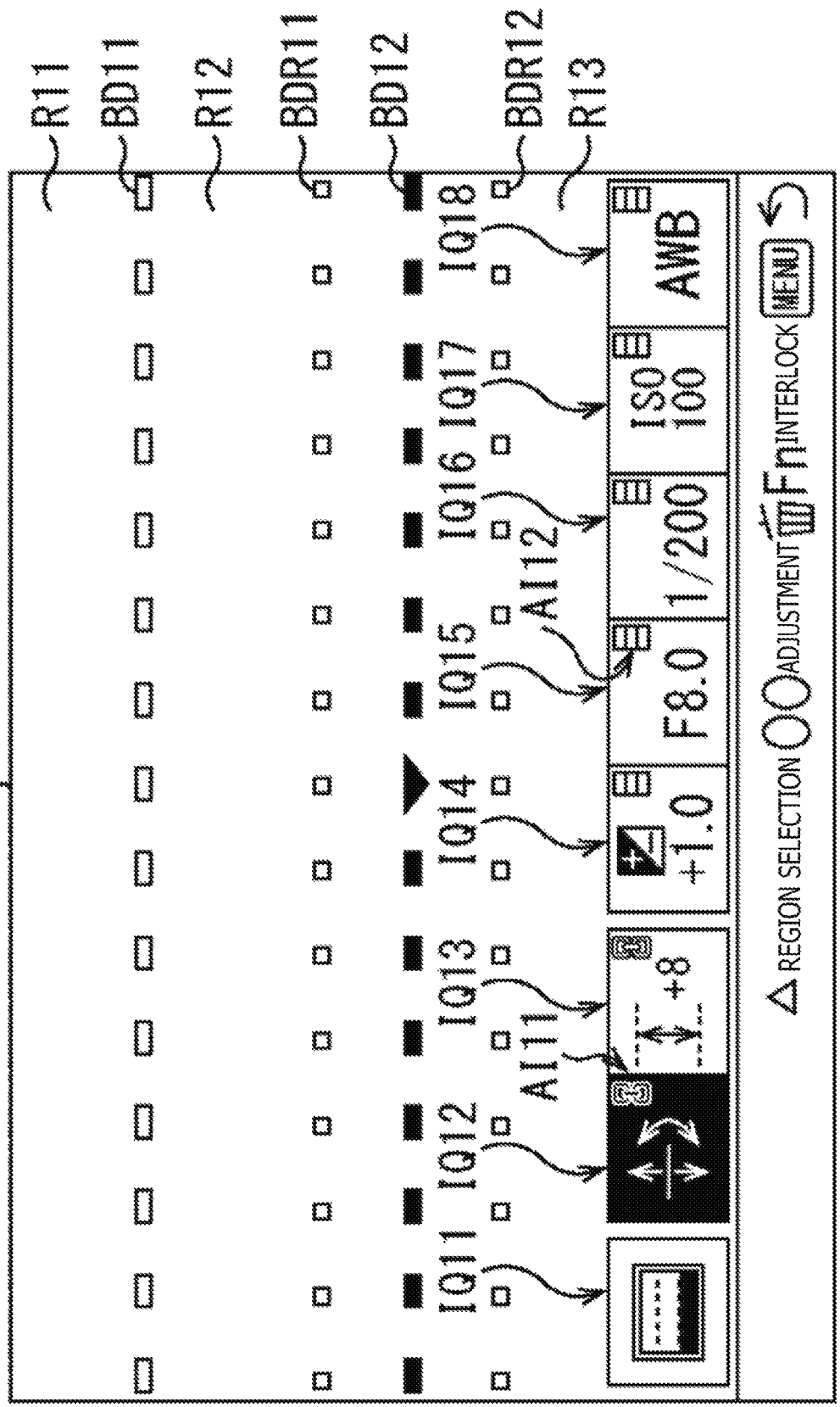
FIG. 3 is a view depicting an example of a display screen image upon setting of a divisional region or an imaging condition.

Furthermore, upon setting of divisional regions or imaging conditions, buttons (icons) for performing such setting are displayed, for example, as depicted in FIG. 3. It is to be noted that, in FIG. 3, portions corresponding to those in the case of FIG. 2 are denoted by identical reference signs, and description of them is suitably omitted.

In this example, on a display screen image of the display unit 26, i.e., on a setting screen image, buttons IQ11 to a IQ18 for performing setting regarding divisional regions or imaging conditions are displayed.

For example, the user can designate into which number of divisional regions the image is to be divided, i.e., the number of divisional regions, by operating the operation unit 27 to select (operate) the button IQ11.

Further, the user can designate a position, an inclination (angle), and so forth of a boundary line of a divisional region by selecting the button IQ12, and can perform designation (setting) regarding the width of a blend region, a mixture ratio, and so forth by selecting the button IQ13.

It is to be noted that setting relating to the buttons IQ11 to IQ13 may be performed after capturing of images for synthesis.

The user can designate brightness (exposure correction value) by selecting the button IQ14, can designate an aperture value (F value) by selecting the button IQ15, and can designate a shutter speed by selecting the button IQ16. Furthermore, the user can designate an ISO sensitivity by selecting the button IQ17 and can designate WB, i.e., a type and a color temperature of WB, by selecting the button IQ18.

As described above, the user can interlock setting of a plurality of boundaries and blend regions when performing setting relating to the button IQ12 or the button IQ13, i.e., setting relating to the position or the inclination of a boundary line between divisional regions, and a width, a mixture ratio, and so forth of a blend region.

For example, when the setting is such that setting relating to a plurality of boundary lines between divisional regions is interlocked and the positions and the inclinations of the boundary lines are changed simultaneously by an equal amount, i.e., are set to a same position and a same inclination, respectively, the icon indicated by an arrow mark AI11 in the button IQ12 is displayed brightly.

Similarly, when the setting is such that setting relating to a plurality of blend regions is interlocked, i.e., in a case where the setting is such that the width, mixture ratio, and so forth are changed simultaneously by an equal amount between a plurality of blend regions, the icon in the button IQ13 is displayed brightly.

In this case, when the user operates the operation unit 27 to designate setting values of the width, mixture ratio, and so forth of the blend regions, the control unit 25 changes the setting values of the blend regions such that the setting values of the width or mixture ratio of the blend regions become an equal value, i.e., become the value designated by the user.

Further, also in regard to imaging conditions for divisional regions, i.e., in regard to such items as the brightness, aperture value, shutter speed, ISO sensitivity, and WB, the user can designate two or more given divisional regions for each item and interlock the setting value of the item of the imaging condition between the plural number of (two or more) divisional regions designated. In short, setting values of an item of a given imaging condition for two or more designated divisional regions can be designated simultaneously.

In this case, it is assumed that, for example, in the example depicted in FIG. 3, the user operates the operation unit 27 to set such that aperture values of an imaging condition for the divisional region R11 and the divisional region R12 are interlocked with each other. Consequently, if the user operates the operation unit 27 to designate a predetermined value as an aperture value for one of the divisional region R11 and the divisional region R12, then the control unit 25 changes the aperture value for the one of the divisional regions to the predetermined value designated by the user and also changes the aperture value for the other divisional region to the predetermined value in an interlocking relationship.

In a case where an item of an imaging condition is set so as to interlock in this manner, on a button associated with the item, i.e., on a button of a corresponding item among the buttons IQ14 to IQ18, an icon indicating which divisional region is set so as to interlock with the button is displayed. In particular, the display controlling unit 42 causes an icon (image), which represents a divisional region with which the item of the imaging condition is set so as to interlock, to be displayed on the setting screen image.

For example, on the button IQ15, an icon AI12 indicating that the setting of the aperture value is interlocked among the divisional regions R11 to R13 is displayed.

In this example, the icon AI12 is an image in which quadrangles individually indicative of divisional regions are juxtaposed on a same positional relationship with that of the divisional regions, and the quadrangles corresponding to divisional regions that are interlocked with each other are displayed brighter. Here, since the quadrangles individually corresponding to the divisional regions R11 to R13 are displayed bright, if an aperture value of any one of the divisional regions is designated, then the aperture values of all of the other divisional regions are also changed to the designated aperture value.

Figure 4:
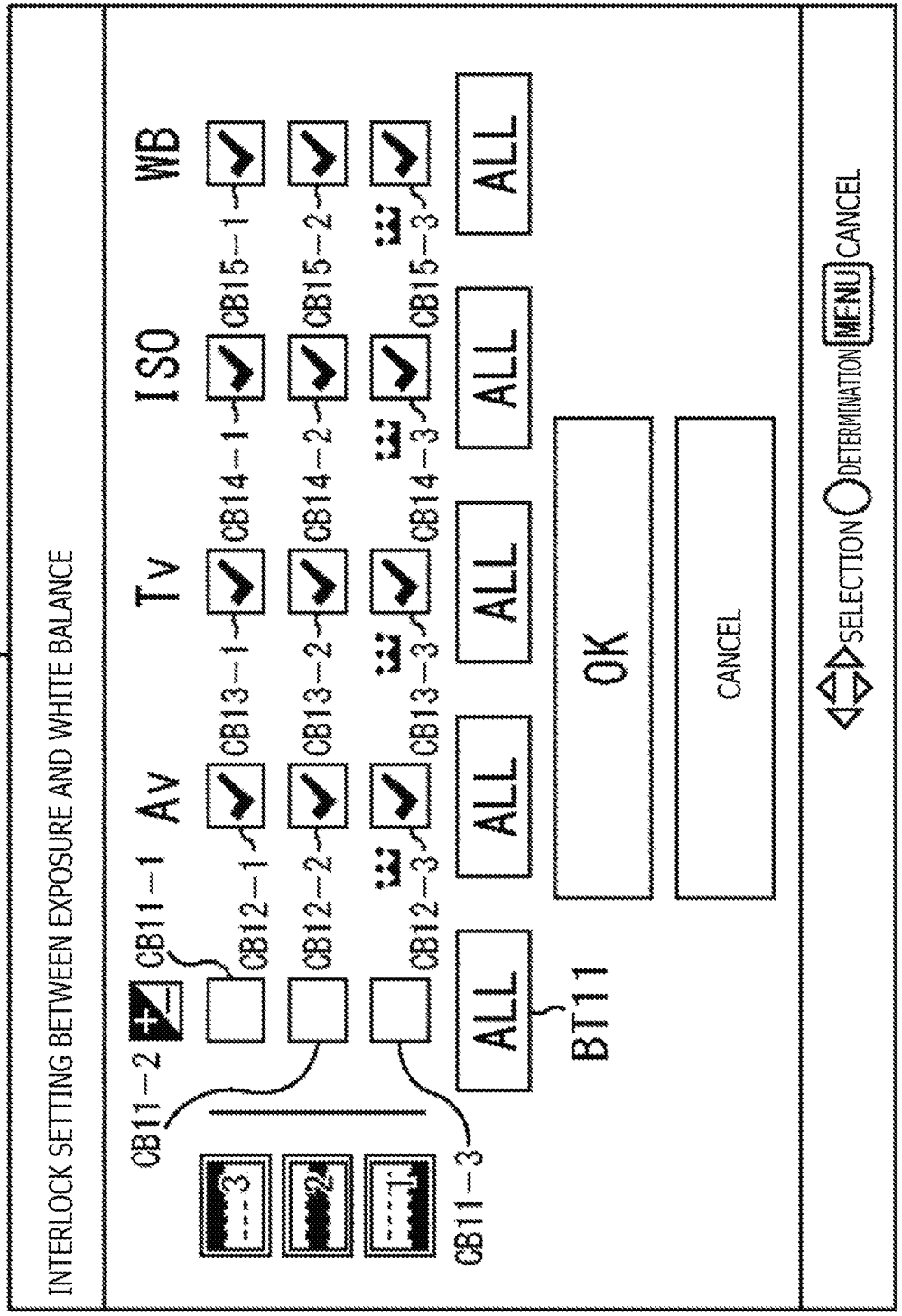
FIG. 4 is a view depicting an example of a display screen image upon interlocking setting of an imaging condition.

Here, an example of a display screen image upon interlocking setting of an imaging condition for divisional regions in a case where a display screen image (image) is divided into three divisional regions is depicted in FIG. 4.

In the example depicted in FIG. 4, a screen image for interlocking setting is displayed on the display unit 26, and check boxes CB11-1 to CB15-1 for interlocking setting of items of imaging conditions for the divisional region R11 depicted in FIG. 3 are provided in the screen image.

Similarly, also check boxes CB11-2 to CB15-2 for interlocking setting of items of imaging conditions for the divisional region R12 depicted in FIG. 3 and check boxes CB11-3 to CB15-3 for interlocking setting of items of imaging conditions for the divisional region R13 depicted in FIG. 3 are provided.

It is to be noted that, in a case where there is no necessity to specifically distinguish the check boxes CB11-1 to CB11-3 from each other, each of them is also simply referred to as check box CB11, and in a case where there is no necessity to specifically distinguish the check boxes CB12-1 to CB12-3 from each other, each of them is also simply referred to as check box CB12.

Similarly, in a case where there is no necessity to specifically distinguish the check boxes CB13-1 to CB13-3 from each other, each of them is also simply referred to as check box CB13, and in a case where there is no necessity to specifically distinguish the check boxes CB14-1 to CB14-3 from each other, each of them is also simply referred to as check box CB14. Furthermore, in a case where there is no necessity specifically distinguish the check boxes CB15-1 to CB15-3 from each other, each of them is also simply referred to as check box CB15.

Each of the check boxes CB11-1 to CB11-3 is provided to interlock each brightness (exposure correction values) of the divisional regions R11 to R13 with each other.

The user can operate the operation unit 27 to cause a check mark to be displayed in a check box CB11 to thereby establish such a setting that the exposure correction value of a divisional region corresponding to the check box CB11 is changed in an interlocking relationship with the exposure correction value of other divisional regions.

Further, the user can operate a button BT11, on which characters "ALL" are indicated, to establish a state in which a check mark is indicated in all of the three check boxes CB11, by a single operation, i.e. collectively.

In the example depicted in FIG. 4, since the three check boxes CB11 are in a state in which a check mark is not displayed in any of them, the exposure correction values of the divisional regions are not interlocked with each other, and setting of an exposure correction value is performed for each of the divisional regions.

Each of the check boxes CB12-1 to CB12-3 is provided to interlock the aperture values of the divisional region R11 to divisional region R13 with each other.

The user can operate the operation unit 27 to display a check mark in a check box CB12 to thereby establish such a setting that the aperture value of a divisional region corresponding to the check box CB12 changes in an interlocking relationship with the aperture value of other divisional regions.

Here, since a check mark is displayed in all of the check boxes CB12, if the aperture value of one of the divisional regions R11 to R13 is changed, then the aperture value after the change is reflected on all of the divisional regions R11 to R13. In other words, all of the aperture values of the divisional regions R11 to R13 become an aperture value same as that designated by the user.

It is to be noted that, upon performing interlocking setting for the first time, the values of the divisional region R13 corresponding to the check box CB12-3, in the proximity of which a mark (icon) of a crown is displayed, are reflected.

In particular, upon performing interlocking setting for the first time or upon changing of the interlocking setting, if a state in which a check mark is displayed in several check boxes CB12 including the check box CB12-3, then the aperture values of divisional regions corresponding to the check boxes CB12 in which a check mark is displayed are set to a value same as the aperture value of the divisional region R13 corresponding to the check box CB12-3.

Further, also on the lower side of the check box CB12-3 in FIG. 4, a button capable of collectively selecting all check boxes CB12 corresponding to the button BT11 is provided.

Each of the check boxes CB13-1 to CB13-3 is provided to interlock the shutter speeds for the divisional regions R11 to R13 with each other.

The user can operate the operation unit 27 to display a check mark in a check box CB13 to thereby establish such a setting that the shutter speed for the divisional region corresponding to the check box CB13 is changed in an interlocking relationship with the shutter speed for other divisional regions.

Again, a mark of a crown is displayed in the proximity of the check box CB13-3 similarly as in the case of the check boxes CB12, and a button for collectively selecting the check boxes CB13 corresponding to the button BT11 is also provided.

Each of the check boxes CB14-1 to CB14-3 is for interlocking the ISO sensitivities of the divisional regions R11 to R13 with each other.

The user can operate the operation unit 27 to display a check mark in a check box CB14 to thereby establish such a setting that the ISO sensitivity of a divisional region corresponding to the check box CB14 is changed in an interlocking relationship with the ISO sensitivity of other divisional regions.

Also in regard to the check boxes CB14, a mark of a crown is displayed in the proximity of the check box CB14-3 similarly as in the case of the check boxes CB12, and a button for collectively selecting the check boxes CB14 corresponding to the button BT11 is also provided.

Each of the check boxes CB15-1 to CB15-3 is for interlocking the settings (adjustment values) of WB of the divisional regions R11 to R13 with each other.

The user can operate the operation unit 27 to display a check mark in a check box CB15 to thereby establish such a setting that the setting of WB of a divisional region corresponding to the check box CB15 is changed in an interlocking relationship with the setting of WB of other divisional regions.

Also in regard to the check boxes CB15, a mark of a crown is displayed in the proximity of the check box CB15-3 similarly as in the case of the check boxes CB12, and a button for collectively selecting the check boxes CB15 corresponding to the button BT11 is also provided.

Furthermore, in a case where setting of an imaging condition is to be performed in a state in which a through image is displayed on the display screen image of the display unit 26, it is possible to reflect an imaging condition designated for a divisional region on the through image to be displayed.

In particular, for example, among all divisional regions, in several divisional regions adjacent to each other that include at least a divisional region for which an imaging condition is being set, a through-image obtained by real time imaging on which the imaging condition being set is reflected is displayed. Further, in other divisional regions, captured images captured previously in imaging conditions set for the divisional regions are displayed as through images.

This makes it possible for the user to imagine a recording image to be actually obtained while watching a through image and designate a more appropriate imaging condition. In other words, convenience in use of the imaging device 11 can be improved.

It is supposed that HDR imaging utilizing the present technology is performed in a state in which the imaging device 11 is basically fixed by a tripod or the like.

Accordingly, after the user determines a composition and so forth of a recording image while a through image is displayed, for example, in a state in which the imaging device 11 is fixed, the user would perform setting of the position or the inclination of a boundary line between divisional regions and imaging conditions and so forth for each of the divisional regions in accordance with the region of an imaging object on the through image.

After a position or an inclination of a boundary line is designated by the user, the display unit 26 is placed into a state in which the boundary line between the divisional regions is displayed in an overlapping relationship with the through image.

However, within a period of time until the user depresses the shutter button to perform capturing of a recording image, after capturing of a recording image is performed once, or in a like case, the user may change the angle of view (focal length) of the imaging device 11, the orientation (inclination) of the imaging device 11, or the like.

In such a case as just described, although boundary lines between divisional regions remain as they are on the display screen image of the display unit 26, the position, size, orientation, or the like of an imaging object in the through image changes together with a change of the focal length or the orientation of the imaging device 11. Therefore, on the display screen image, a relative positional relationship between the boundary lines (divisional regions) and the imaging object on the through image changes. This applies not only to boundary lines between divisional regions but also to boundary lines between blend regions.

This gives rise to the necessity to adjust the position or the inclination of the boundary lines between the divisional regions and so forth again. However, it is cumbersome for the user to perform such readjustment of the position, inclination, or the like of boundary lines. Especially as displacement in relative positional relationship between the boundary lines between the divisional regions and so forth and the imaging object on the through image becomes great, the labor for the readjustment also increases.

Therefore, when a change of the focal length of the imaging device 11 or a change of the inclination or the like of the imaging device 11, i.e., a change of the rotation angle or the inclination angle, is detected, the display position or the inclination of overlapping display information of boundary lines between divisional regions, boundary lines between blend regions, and so forth is adjusted in accordance with a change of the size, position, inclination, or the like of the imaging object on the display screen without the necessity of an operation by the user. In particular, in a case where the inclination or the focal length of the imaging device 11 changes, the display position or the inclination of boundary lines is adjusted such that a relative positional relationship between the imaging object of the through image and boundary lines between divisional regions and so forth is maintained before and after the change. By this, the convenience in use of the imaging device 11 can be improved.

It is to be noted that the overlapping display information mentioned here is not limited to boundary lines between divisional regions or boundary lines between blend regions and may be any information if it is displayed in an overlapping relationship with a through image on the display unit 26.

In particular, for example, OSD (On Screen Display) information such as grid lines, horizontal lines, or vertical lines, a point indicative of a position or a region that becomes a reference, an icon, a curved line indicative of a contour of a face of a person as an imaging object on a through image inputted from the operation unit 27 by the user, and so forth can be made overlapping display information. Especially, it is more preferable if the overlapping display information is information associated with an imaging object on a through image such as boundary lines between divisional regions, in short, relevant information.

In the following, description is continued assuming that the overlapping display information is boundary lines between divisional regions or boundary lines between blend regions. Further, it is assumed that, when the term boundary line is used simply without notice, this indicates a boundary line between divisional regions.

In the following, particular examples of adjustment of the display position and the inclination of a boundary line between divisional regions as overlapping display information are described.

It is to be noted that, by the correction amount calculation unit 41, not only correction information for performing display correction of a boundary line between divisional regions as overlapping display information but also correction information for performing display correction of other overlapping display information such as boundary lines between blend regions can be obtained. However, since the correction information of such overlapping display information can be obtained by a similar calculation, calculation of correction information of a boundary line between divisional regions is described here.

Figure 5:
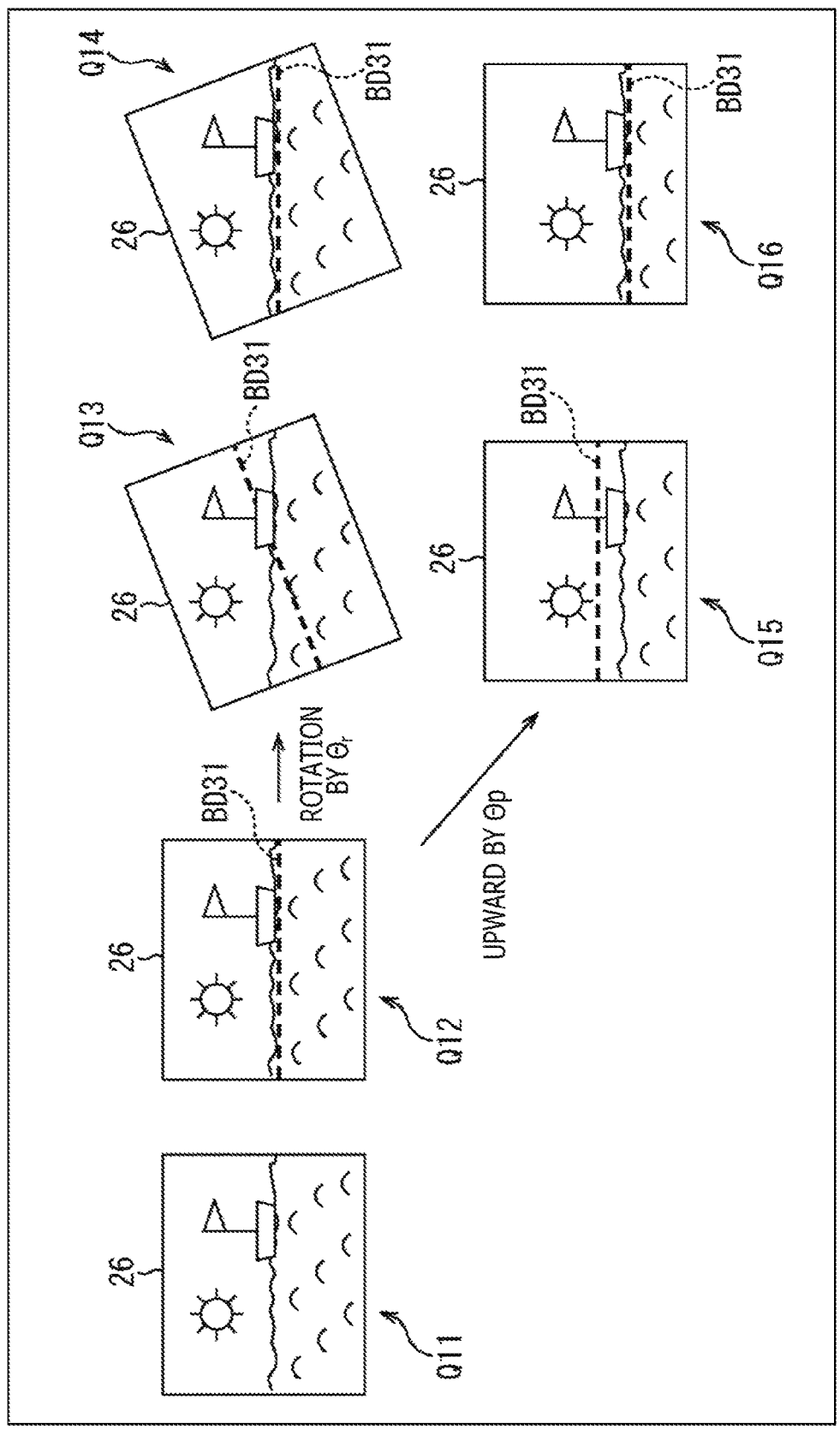
FIG. 5 is a view illustrating the present technology.

For example, it is assumed that a through image is displayed on the display unit 26, for example, in a state in which the imaging device 11 is not inclined as indicated by an arrow mark Q11 of FIG. 5, i.e., in a state in which the imaging device 11 is orientated to the front and not only the rotation angle but also the inclination angle is 0 degree.

Here, on the through image, the sea, a ship, the sun, and so forth are displayed as imaging objects. Further, in the following description, the rotation angle is sometimes also represented as $\theta_r$ and the inclination angle is sometimes also represented as $\theta_p$.

It is assumed that, in regard to the rotation angle $\theta_r$, a counterclockwise direction as viewed from a user who views a display screen image of the display unit 26 from the front, i.e., a counterclockwise direction in FIG. 5, is a positive direction. Meanwhile, in regard to the inclination angle $\theta_p$, it is assumed that an upward direction as viewed from a user who views a display screen image of the display unit 26 from the front, i.e., the upward direction in FIG. 5, is a positive direction.

It is assumed that, in a state indicated by an arrow mark Q11, the user operates the operation unit 27 to divide a display screen image of the display unit 26, i.e., a through image, into two divisional regions.

Consequently, on the display screen image of the display unit 26, a boundary line BD31 between divisional regions is displayed in an overlapping relationship with the through image as indicated by an arrow mark Q12, for example.

In this example, a position and an inclination of the boundary line BD31 are designated such that the boundary line BD31 overlaps with the boundary between the sea and the sky, which are imaging objects of the through image, i.e., with the horizon. The user can operate the operation unit 27 to move the boundary line BD31 or incline the boundary line BD31, i.e., rotate the boundary line BD31, on the display screen image, to adjust the display position or the inclination.

By designating the boundary line BD31 in such a manner as indicated by an arrow mark Q12, the user can set an imaging condition individually for the portion of the sky and the portion of the sea as imaging objects.

Further, if the user rotates the imaging device 11 by a rotation angle $\theta_r$ in a counterclockwise direction as viewed from the user after designation of the boundary line BD31, then displacement appears between the horizon as an imaging object and the boundary line BD31 as indicated by an arrow mark Q13.

Therefore, if this goes on, then the imaging condition for the sky as an imaging object comes to be applied also to a region of a left side portion of the sea as an imaging object in the display screen image in FIG. 5, i.e., to a region of an upper side portion of the sea as an imaging object with respect to the boundary line BD31 in FIG. 5. In a case where the present technology is not applied, display of the boundary line BD31 remains in the state indicated by the arrow mark Q13.

Therefore, the correction amount calculation unit 41 determines, as correction information, on the basis of the rotation angle $\theta_r$ included in detection angle information supplied from the angle detection unit 24, a correction amount when the boundary line BD31 is to be displayed, more particularly, a display position and an inclination of the post-display correction boundary line BD31.

Then, the display controlling unit 42 controls the display of the boundary line BD31 on the display unit 26 such that the boundary line BD31 is displayed with an inclination determined by the correction amount calculation unit 41 at a display position determined by the correction amount calculation unit 41. In short, the display position and the inclination of the boundary line BD31 are corrected on the basis of the correction information.

Here, display correction of the boundary line BD31 is performed such that the boundary line BD31 is rotated only by the angle $-\theta_r$ with respect to the display screen image.

By this, even after the rotation of the imaging device 11, a state in which the horizon as an imaging object and the boundary line BD31 are not displaced from each other and the horizon and the boundary line BD31 are placed in an overlapping state with each other as indicated by an arrow mark Q14 can be established. Further, the control unit 25 also corrects the divisional regions together with the correction of the display position and the inclination of the boundary line BD31.

As a result, the imaging condition set for the sky by the user is applied correctly to the region of the sky of the image, and the imaging condition set for the sea is applied correctly to the portion of the region of the sea of the image. In other words, it becomes possible to obtain a recording image of high quality without performing a cumbersome operation such as setting of a display position and so forth of the boundary line BD31 again by the user, and the convenience in use of the imaging device 11 can be improved.

Similarly, if, after the designation of the boundary line BD31, the user inclines (swings) the imaging device 11 by the inclination angle $\theta_p$ to the upper side in the vertical direction as viewed from the user, then displacement appears between the horizon as an imaging object and the boundary line BD31 as indicated by an arrow mark Q15. Here, the boundary line BD31 is displaced in the upward direction in FIG. 5 with respect to the horizon.

In this case, since a relative positional relationship between the horizon and the boundary line BD31 indicates a change similarly as in the example indicated by the arrow mark Q13, if this goes on, then the imaging condition determined for the portion of the region of the sea as an imaging object is also applied to a region of part of the sky as an imaging object. In short, in the case where the present technology is not applied, the display of the boundary line BD31 remains in the state indicated by the arrow mark Q15.

Therefore, the correction amount calculation unit 41 determines, as correction information, on the basis of the inclination angle $\theta_p$ included in detection angle information supplied from the angle detection unit 24 and the focal length information, a correction amount when the boundary line BD31 is to be displayed, more particularly, a display position and an inclination of the post-display correction boundary line BD31.

Then, the display controlling unit 42 performs display correction of the boundary line BD31 on the display unit 26 on the basis of the correction information determined by the correction amount calculation unit 41.

By this, even after the imaging device 11 is swung as indicated by an arrow mark Q16, there is no displacement between the horizon as an imaging object and the boundary line BD31, and the horizon and the boundary line BD31 can be placed in a state in which they overlap with each other. As a result, the user is able to obtain a recording image of high quality without performing a cumbersome operation such as setting of a position of the boundary line BD31 again, and the convenience in use of the imaging device 11 can be improved.

Now, a particular example of display correction of a boundary line between divisional regions such as the boundary line BD31 is described in more detail.

For example, it is assumed that the imaging device 11 is rotated by the inclination angle $\theta_r$. In other words, it is assumed that detection angle information including the rotation angle $\theta_r$ and the inclination angle $\theta_p=0$ is outputted from the angle detection unit 24.

Figure 6:
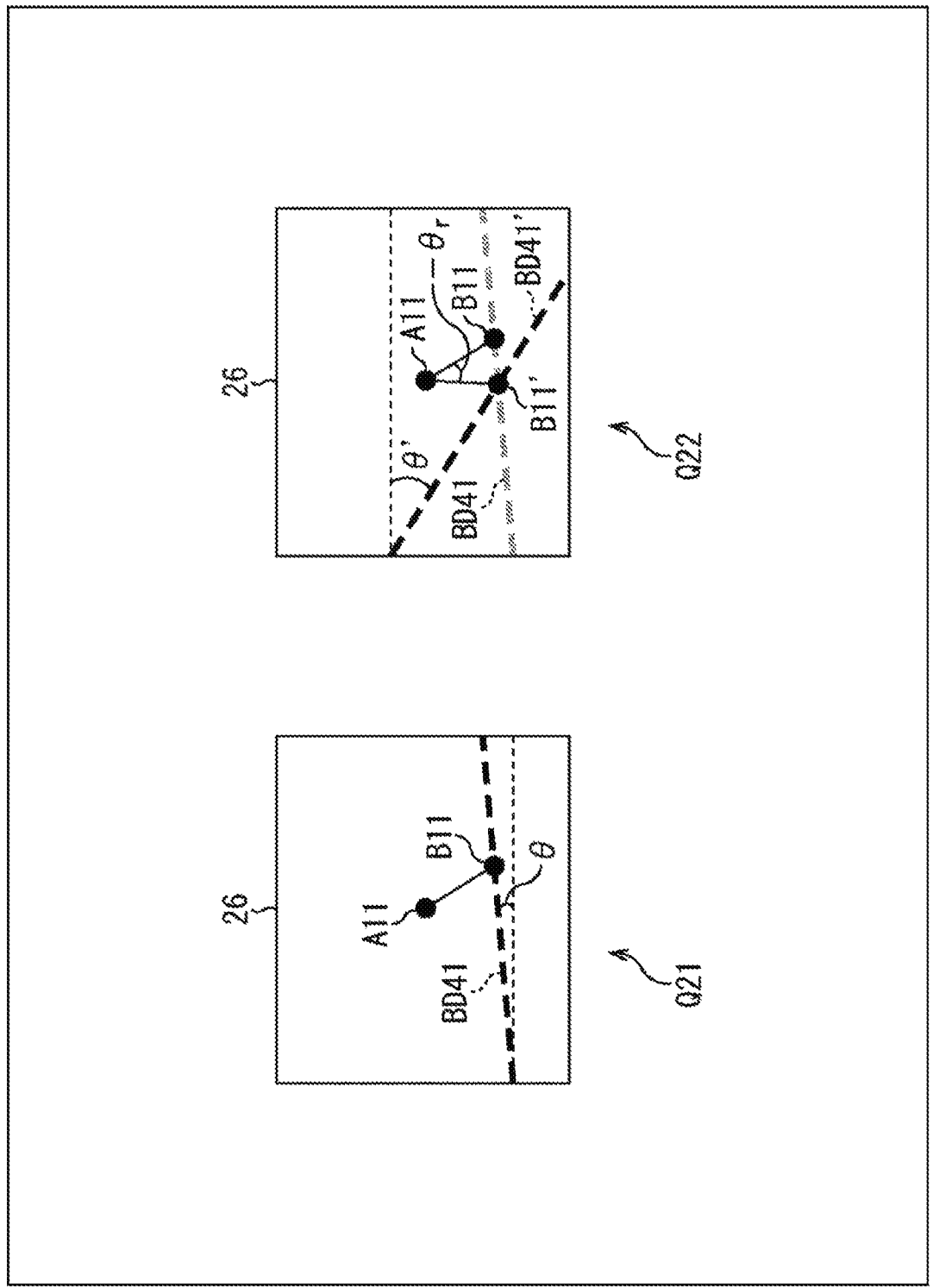
FIG. 6 is a view illustrating display correction of a boundary line.

In this case, it is assumed that a boundary line BD41 between divisional regions is displayed on a display screen image of the display unit 26 as indicated by an arrow mark Q21 of FIG. 6. Here, the boundary line BD41 is displayed in a state before display correction, i.e., before the imaging device 11 is rotated by the rotation angle $\theta_r$.

Further, a point at the center position of the display screen image of the display unit 26 is denoted as point A11, and a point at a given position on the boundary line BD41 is denoted as point B11.

It is to be noted that the point A11 corresponds to the center position of an imaging plane in the imaging unit 22, i.e., to a cross point between the imaging plane and the optical axis of the imaging lens 21 and is also the point of the center position of the through image.

Further, the inclination of the boundary line is denoted as inclination $\theta$, and a direction of such an inclination that the right side end of the boundary line is positioned on the upper side and the left side end of the boundary line is positioned on the lower side with respect to a straight line parallel to a lower side edge of the display screen image as viewed from the user who watches the display screen image of the display unit 26 from the front is a positive direction of the inclination $\theta$.

In the example of FIG. 6, the angle defined by the lower side edge of the display screen image of the display unit 26 in FIG. 6, i.e., the lower side edge of the through image in FIG. 6, and the boundary line BD41 is the inclination $\theta$ of the boundary line BD41.

The correction amount calculation unit 41 utilizes the rotation angle $\theta_r$, point A11, and point B11 to determine the inclination $\theta$ of the boundary line BD41 after correction.

It is to be noted that the boundary line BD41 after correction and the inclination $\theta$ of the boundary line BD41 after correction are also referred to as boundary line BD41' and inclination $\theta'$, respectively. Further, the point B11 of the boundary line BD41 after correction on the display screen image of the display unit 26, i.e., on the through image, i.e., the point corresponding to the point B11 on the boundary line BD41', is also referred to as point B11'.

If the boundary line BD41', point B11', and inclination θ' are depicted, then they are as represented by an arrow mark Q22. It is to be noted that, since the point A11 is the center of rotation of the imaging device 11, the position of the point A11 is identical before and after display correction.

Further, in this case, since the imaging device 11 is rotated by the angle $\theta_r$, the angle defined by a straight line interconnecting the point A11 and the point B11 and a straight line interconnecting the point A11 and the point B11' is $-\theta_r$. In short, the position of the point B11' is a position when the point B11 is rotated by $-\theta_r$ around the center of rotation given by the point A11.

Upon correction of the boundary line BD41, the correction amount calculation unit 41 first determines a position (coordinates) of the point B11' by coordinate conversion on the basis of the position (coordinates) and the rotation angle $\theta_r$ of the point B11.

Here, as described above, the position when the point B11 is rotated by $-\theta_r$ around the center of rotation given by the point A11 is the position of the point B11'. It is to be noted that the position of the point B11 can be determined from the display position and the inclination θ of the boundary line BD41 displayed in an overlapping relationship with the through image.

Then, the correction amount calculation unit 41 determines the inclination θ' of the boundary line BD41' on the basis of the inclination θ and the rotation angle $\theta_r$ of the boundary line BD41. In particular, the correction amount calculation unit 41 calculates the inclination θ' by subtracting the rotation angle $\theta_r$ from the inclination θ as indicated by the following expression (1).

[Math. 1]

$$\theta' = \theta - \theta_r \quad (1)$$

Where the inclination θ' and the position of the point B11' are determined in this manner, the inclination θ' and the position of the point B11' are obtained as correction information for display correction of the boundary line BD41'.

The display controlling unit 42 controls the display unit 26 on the basis of the inclination θ' and the position of the point B11' obtained in this manner to display (draw) the boundary line BD41' on the display screen image of the display unit 26. In this case, it is sufficient if a straight line of the inclination θ' that passes the point B11' is displayed as the boundary line BD41' on the display screen image.

By this, the boundary line BD31 after the correction is displayed correctly in an overlapping relationship with the through image as indicated, for example, by the arrow mark Q14 of FIG. 5.

Now, display correction of a boundary line between divisional regions, for example, in a case where the focal length information of the imaging lens 21 changes, i.e., in a case where a zoom operation is performed, is described. Note that it is assumed here that only a zoom operation is performed and there are no rotation and swinging of the imaging device 11. In other words, both the rotation angle $\theta_r$ and the inclination θ are 0 degree.

Figure 7:
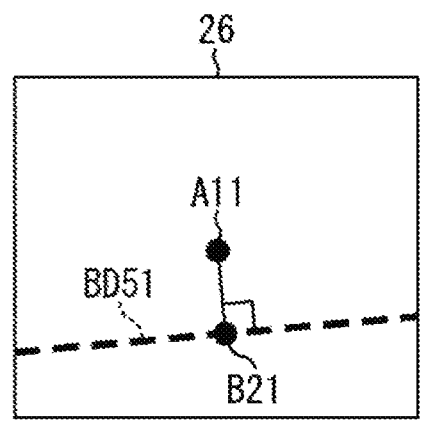
FIG. 7 is a view illustrating display correction of a boundary line.

For example, as illustrated in FIG. 7, it is assumed that a boundary line BD51 between divisional regions is displayed on a display screen image of the display unit 26. It is to be noted that, in FIG. 7, elements corresponding to those in the case of FIG. 6 are denoted by identical reference signs and description of them is suitably omitted.

In this example, a point B21 is given by a cross point between a boundary line BD51 and a perpendicular when the perpendicular is drawn from the point A11 at the center position of the display screen image to the boundary line BD51.

Figure 8:
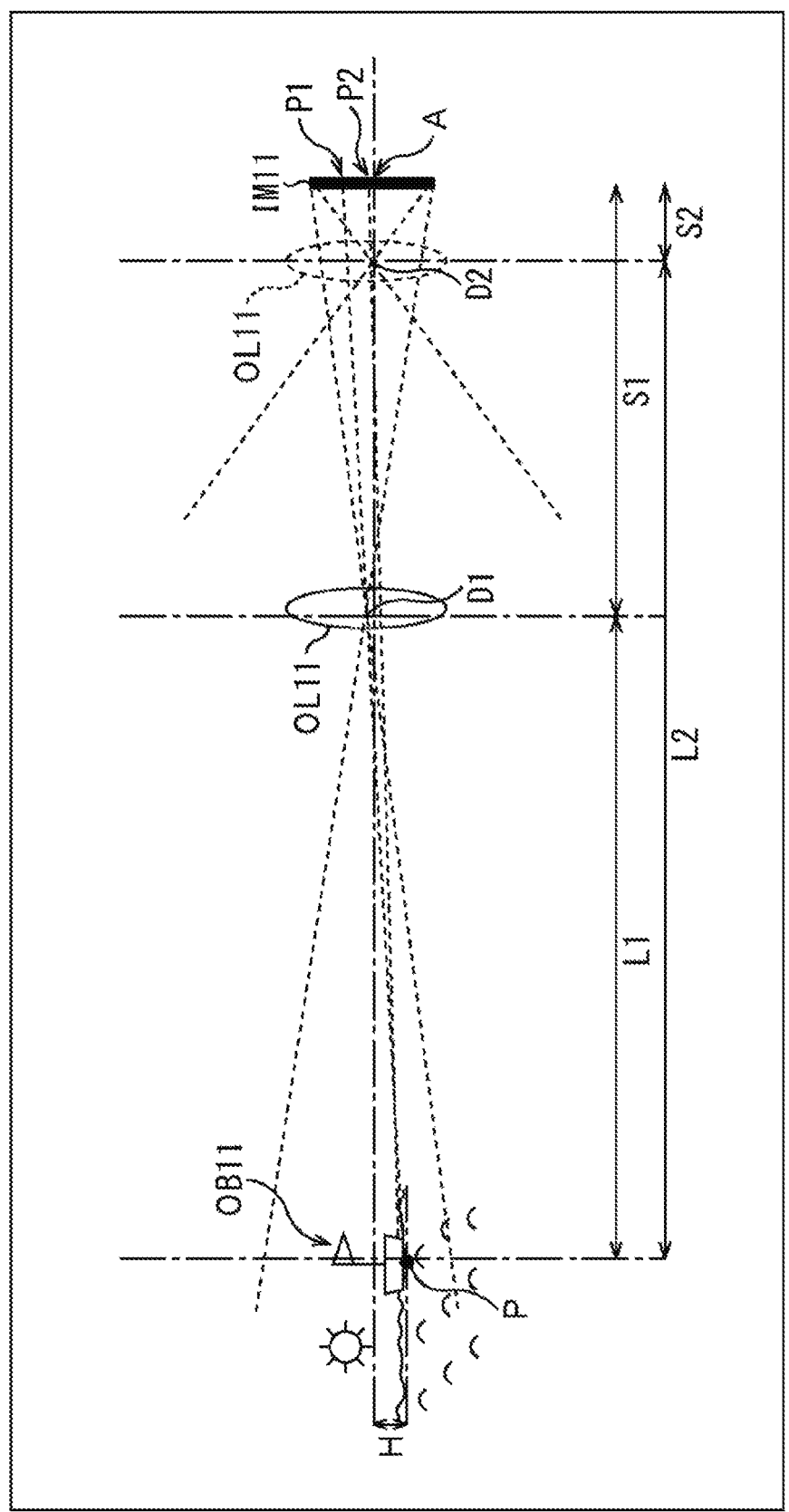
FIG. 8 is a view illustrating display correction of a boundary line.

It is assumed that, in such a condition as just described, the principal point position of an optical lens OL11 configuring the imaging lens 21 as depicted in FIG. 8, i.e., the in-focus position, is the position of a point D1 and the focal length of the imaging lens 21 is S1.

In FIG. 8, an imaging object OB11 in an actual space, the optical lens OL11 configuring the imaging lens 21, and an imaging element IM11 configuring the imaging unit 22 are depicted, and a point on the imaging object OB11 is a point P. Here, it is assumed that the point P is a location of an imaging object corresponding to the point B21 depicted in FIG. 7. In other words, the point P of the imaging object OB11 is reflected at the point B21 on a through image, i.e., on a display screen image of the display unit 26.

Further, a center position of an imaging plane of the imaging element IM11 is the point A. This point A corresponds to the point A11 that is the center position of the through image depicted in FIG. 7, i.e., the center position of the display screen image.

In a state in which the principal point of the optical lens OL11 is at the point D1, the distance from the point D1 to the point A on the imaging element IM11 in a direction of an optical axis of the optical lens OL11 is the focal length S1 of the optical lens OL11. In this case, from the lens information communication unit 23, focal length information indicative of the focal length S1 is outputted.

Further, a formation position of an optical image of the point P in this state is represented as point P1. In short, it is assumed that an image of the point P is at the position of the point P1 on the imaging element IM11. Further, the distance from the point D1 at the principal position of the optical lens OL11 to the point P in the direction of the optical axis of the optical lens OL11 is represented by L1, and the distance from the optical axis of the optical lens OL11 to the point P in a direction perpendicular to the optical axis of the optical lens OL11 is represented by H.

It is assumed, for example, the user performs a zoom operation from a state in which the principal point of the optical lens OL11 is at the point D1 such that the principal point of the optical lens OL11 comes to a point D2.

Thus, the focal length of the optical lens OL11 becomes S2 that is a distance from the point D2 which is a principal position of the optical lens OL11 after the zoom operation to the point A, and a distance from the principal point of the optical lens OL11 to the point P also changes to L2. Furthermore, the position of the image of the point P on the imaging element IM11 also moves from the point P1 to a point P2.

Here, the focal length S2 is a distance from the point D2 at the principal point of the optical lens OL11 to the point A on the imaging element IM11 in the direction of the optical axis of the optical lens OL11, and the distance L2 is a distance from the point D2 at the principal position of the optical lens OL11 to the point P in the direction of the optical axis of the optical lens OL11.

Further, the distance from the point A to the point P1 on the imaging element IM11 is also referred to as distance p1, and the distance from the point A to the point P2 on the imaging element IM11 is also referred to as distance p2.

If a zoom operation is performed such that the principal point of the optical lens OL11 comes to the position of the point D2 in this manner, then focal length information indicative of the focal length S2 is outputted from the lens information communication unit 23.

Figure 9:
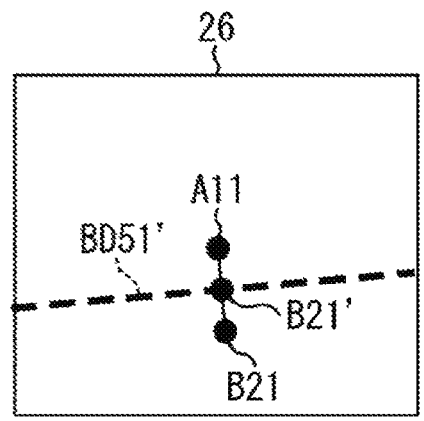
FIG. 9 is a view illustrating display correction of a boundary line.

If a zoom operation is performed from a state depicted in FIG. 7 in which the principal point of the optical lens OL11 is at the position of the point D1 and the principal point of the optical lens OL11 moves to the position of the point D2, then the display of the display screen image of the display unit 26 becomes such as depicted in FIG. 9. It is to be noted that, in FIG. 9, portions corresponding to those in the case of FIG. 7 are denoted by identical reference signs, and description of them is suitably omitted.

In FIG. 9, a point B21' indicates a position after movement of the point B21 that moves together with the zoom operation, and this point B21' corresponds to the point P2 depicted in FIG. 8. It is to be noted that, in FIG. 9, the point B21 depicted in FIG. 7 is also depicted in order to facilitate understanding of description.

Further, a boundary line BD51' indicates the boundary line BD51 after display correction is performed together with the zoom operation.

In a state before the zoom operation, the point B21 is positioned on the boundary line BD51, and here, only a zoom operation is performed. Therefore, it is sufficient if a straight line that passes the point B21', i.e. the position after the movement of the point B21, and has an inclination θ equal to that of the boundary line BD51 is made a boundary line BD51' to be displayed after the zoom operation, i.e., the post-display correction boundary line BD51'.

In the example depicted in FIG. 9, the boundary line BD51' is a straight line that passes the point B21' and has an inclination θ same as that of the boundary line BD51. In order to cause such a boundary line BD51' as just described to be displayed as a post-display correction boundary line, it is sufficient if a position of the point B21' is determined.

Here, the position (coordinates) of the point B21' is to be determined.

In order to determine the position of the point B21', it is sufficient if the distance p2 from the point A to the point P2 depicted in FIG. 8 is determined. The following expressions (2) and (3) are derived from a positional relationship between the point P and the point P2 depicted in FIG. 8, i.e., from the relationship of similarity between triangles.

[Math. 2]

$$p2/S2 = H/L2 \qquad (2)$$
$$= H/(L1 + S1 - S2)$$

[Math. 3]

$$p1/S1 = H/L1 \qquad (3)$$

Further, if the ratio between the expression (2) and the expression (3) is determined, then such an expression (4) as given below is obtained, and by transforming the expression (4), the distance p2 can be determined as indicated by an expression (5).

[Math. 4]

$$p2 \times S1/(p1 \times S2) = L1/(L1+S1-S2) \qquad (4)$$

[Math. 5]

$$p2 = (1/(1+(S1-S2)/L1)) \times p1 \times S2/S1 \qquad (5)$$

Here, by making the distance L1 in the expression (5) to ∞, the distance p2 becomes such as indicated by the following expression (6).

[Math. 6]

$$p2 = p1 \times S2/S1 \qquad (6)$$

In this manner, the distance p2 can be represented by the distance p1, focal length S2, and focal length S1. Here, the point P1 and the point P2 depicted in FIG. 8 correspond to the point B21 and the point B21' of FIG. 9, respectively, and the point A of FIG. 8 corresponds to the point A11 of FIG. 9. Further, since the positions of the point A and the point A11 are invariable across the zoom operation, it can be recognized that the following expression (7) is satisfied from the expression (6).

[Math. 7]

$$AB' = AB \times S2/S1 \qquad (7)$$

It is to be noted that, in the expression (7), AB' indicates a distance from the point A11 to the point B21' in FIG. 9, and AB indicates a distance from the point A11 to the point B21 in FIG. 9.

Here, the position (coordinates) of the point A11 and the position (coordinates) of the point B21 are known, and the focal length S1 and the focal length S2 can be obtained as focal length information before and after zooming.

Accordingly, the correction amount calculation unit 41 can determine a position of the point B21' from the position of the point A11, the position of the point B21, the focal length S1, the focal length S2, and the expression (7). The correction amount calculation unit 41 can obtain the display position and the inclination θ of the boundary line BD51' as correction information from a result of calculation of the position of the point B21'.

It is to be noted here that, although a case in which the distance L1 in the expression (5) is ∞ is described, when the distance L1 can be obtained from an input of the operation unit 27 by the user, an output of a distance measurement sensor not depicted, or the like, the obtained distance L1 may be substituted into the expression (5) such that the distance p2 can be determined.

Further, display correction of a boundary line between divisional regions in a case where the imaging device 11 is swung by the inclination angle $\theta_p$ is described. Note that it is assumed here that the focal length of the imaging lens 21 does not indicate a change and that rotation of the imaging device 11 around the optical axis is not indicated as well.

Figure 10:
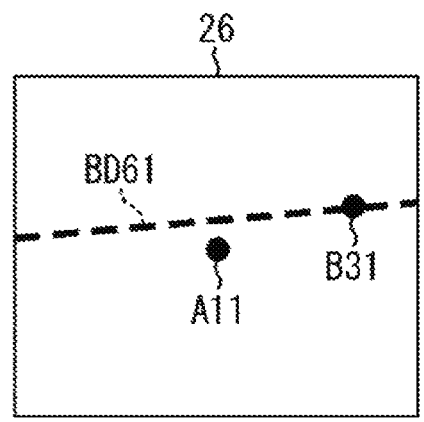
FIG. 10 is a view illustrating display correction of a boundary line.

It is assumed that, for example, a boundary line BD61 between divisional regions is displayed on a display screen image of the display unit 26 as depicted in FIG. 10. It is to be noted that, in FIG. 10, portions corresponding to those in the case of FIG. 6 are denoted by identical reference signs, and description of them is suitably omitted.

In this example, a point at a predetermined position on the boundary line BD61 is a point B31.

It is assumed that the imaging device 11 is swung by the inclination angle $\theta_p$ in a state in which the boundary line BD61 is displayed in this manner.

Figure 11:
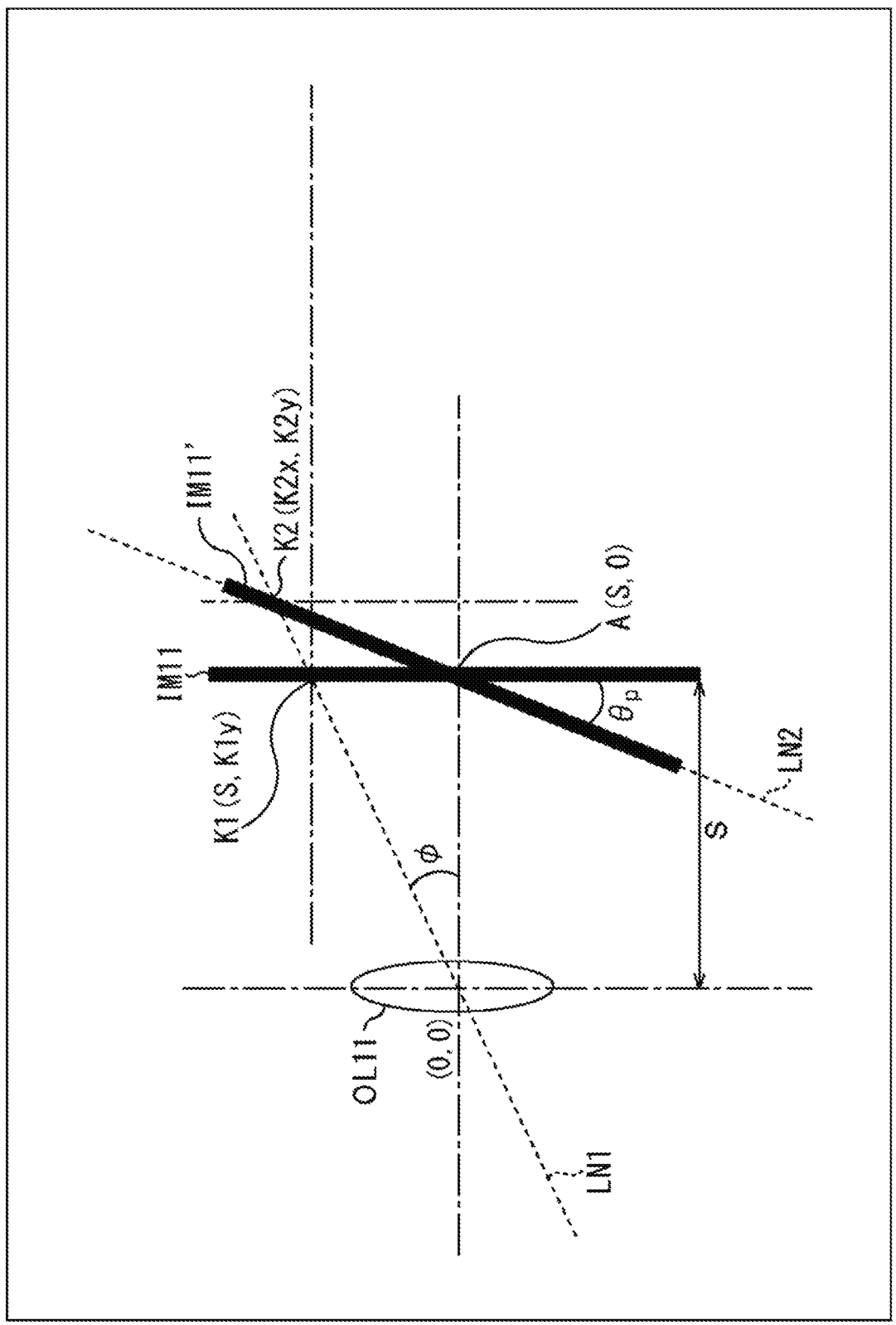
FIG. 11 is a view illustrating display correction of a boundary line.

Thus, the imaging element of the imaging unit 22 is inclined upwardly by the inclination angle $\theta_p$ in an actual space as depicted in FIG. 11. It is to be noted that, in FIG. 11, portions corresponding to those in the case of FIG. 8 are denoted by identical reference signs, and description of them is suitably omitted.

In FIG. 11, the imaging element IM11 after being inclined by the inclination angle $\theta_p$ is represented as imaging element IM11', and it is assumed that, when the imaging device 11 is swung, the imaging device 11 is inclined (rotated) around a straight line that passes a point A that is the position of the center of the imaging element IM11.

Now, an xy coordinate system is considered in which, in FIG. 11, a vertical direction is a y-axis direction (y direction) while a horizontal direction is an x-axis direction (x direction) and a principal point position of the optical lens OL11 before the imaging device 11 is inclined by the inclination angle $\theta_p$ is the origin. Further, the position of a point whose x coordinate is x and whose y coordinate is y, i.e., the coordinates, is represented as (x, y). Here, in FIG. 11, a rightward direction is a positive direction of the x direction, and an upward direction is a positive direction of the y direction.

At this time, the coordinates of the principal point position of the optical lens OL11 are (0, 0). Meanwhile, if the focal length of the optical lens OL11, i.e., the distance from the principal point of the optical lens OL11 to the point A at the center position of the imaging element IM11, is represented by S, then the coordinates of the position of the point A are (S, 0).

Furthermore, a point on the imaging element IM11 corresponding to the point B31 depicted in FIG. 10 is represented as point K1 while the coordinates of the point K1 are represented as (S, K1y), and a straight line that passes the principal point of the optical lens OL11 and the point K1 is represented as a straight line LN1. Here, it is assumed that the inclination of the straight line LN1 is $\varphi$.

Further, a cross point between the imaging element IM11' and the straight line LN1 on the imaging element IM11' after the imaging device 11 is inclined by the inclination angle $\theta_p$ is represented as point K2 and the coordinates of the point K2 are represented as (K2x, K2y), and a straight line passing the point A and the point K2 is represented as a straight line LN2.

In such a case as described above, by determining a distance from the point A to the point K2 in FIG. 11, the display position of the boundary line BD61 after the imaging device 11 is inclined by the inclination angle $\theta_p$ can be determined similarly as in the examples described hereinabove with reference to FIGS. 7 to 9.

Figure 12:
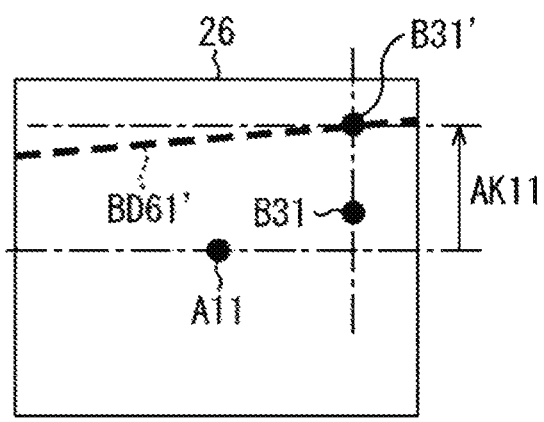
FIG. 12 is a view illustrating display correction of a boundary line.

For example, if the imaging device 11 is swung by the inclination angle $\theta_p$ from a state in which the display screen image of the display unit 26 is in such a state as depicted in FIG. 10, then the display of the display screen image of the display unit 26 changes to one as depicted in FIG. 12. It is to be noted that, in FIG. 12, portions corresponding to those in the case of FIG. 10 are denoted by identical reference signs, and description of them is suitably omitted.

In FIG. 12, a point B31' indicates a position after movement of the point B31 that is moved because the imaging device 11 is swung by the inclination angle $\theta_p$, and this point B31' corresponds to the point K2 depicted in FIG. 11. It is to be noted that, in FIG. 12, also the point B31 depicted in FIG. 10 is depicted in order to facilitate understanding of description.

Here, since the imaging device 11 is swung by the inclination angle $\theta_p$ and rotation of the imaging device 11 around the optical axis is not performed, the point B31 does not move in the horizontal direction in FIG. 12 and only moves vertically, i.e., in the vertical direction (in a vertical direction). In other words, the point B31' and the point B31 are positioned at the same position in the horizontal direction in FIG. 12.

Further, a boundary line BD61' indicates the boundary line BD61 after display correction is performed together with swinging of the imaging device 11 by the inclination angle $\theta_p$.

In a state before the imaging device 11 is swung, the point B31 is positioned on the boundary line BD61, and here, only swinging movement of the imaging device 11 is performed. In other words, the rotation angle $\theta_r=0$ is satisfied. Therefore, it is sufficient if a straight line that passes the point B31', i.e. the position after the movement of the point B31, and has an inclination $\theta$ equal to that of the boundary line BD61 is made the post-display correction boundary line BD61'.

In the example depicted in FIG. 12, the boundary line BD61' is a straight line that passes the point B31' and has an inclination $\theta$ equal to that of the boundary line BD61. In order to cause such a boundary line BD61' as just described to be displayed as a post-display correction boundary line, it is sufficient if the position of the point B31' is determined.

The position (coordinates) of this point B31' can be determined from the position (coordinates) of the point B31 that is known and a distance AK11 in a vertical direction in FIG. 12 from the point A11 to the point B31'. This is because the point B31' and the point B31 are positioned at a same position in the horizontal direction in FIG. 12.

Here, the distance AK11 corresponds to the distance from the point A to the point K2 depicted in FIG. 11.

Since a relationship between a size of the display screen image (through image) of the display unit 26 and a size of the imaging plane of the imaging element IM11, i.e., a relationship between pixel pitch of the display screen image and that of the imaging element IM11, is known, the distance AK11 can be obtained from the relationship between the pixel pitches (ratio of the pixel pitches) and the distance from the point A to the point K2.

In a case where the distance from the point A to the point K2 depicted in FIG. 11 is to be determined, the coordinates (K2x, K2y) of the point K2 are first determined. The coordinates of the point K2 (K2x, K2y) can be obtained by determining the coordinates of a cross point between the straight line LN1 and the straight line LN2.

First, the straight line LN1 can be represented by the following expression (8), and the straight line LN2 can be represented by the following expression (9).

[Math. 8]

$$LN1: y = x \tan(\varphi), \quad \varphi = \arctan(K1y/S) \tag{8}$$

[Math. 9]

$$LN2: y = (x - S)\tan(\pi/2 - \theta_p) \tag{9}$$

It is to be noted that the focal length S of the optical lens OL11 in the expressions (8) and (9) can be obtained from focal length information outputted from the lens information communication unit 23, and the inclination angle $\theta_p$ in the expression (9) can be obtained from detection angle information outputted from the angle detection unit 24.

Further, the y coordinate K1y of the point K1 in the expression (8) can be obtained from the position (coordinates) of the point B31 that is known and the ratio between the pixel pitch of the display screen image of the display unit 26 and the pixel pitch of the imaging element IM11.

Further, from these expressions (8) and (9), the following expression (10) is satisfied, and by transforming the expression (10), the following expression (11) is obtained.

[Math. 10]

$$x \tan(\varphi) = (x - S)\tan(\pi/2 - \theta_p) \quad (10)$$

[Math. 11]

$$x = S \tan(\pi/2 - \theta_p)/(\tan(\pi/2 - \theta_p) - \tan(\varphi)) \quad (11)$$

Since the point K2 is a cross point between the straight line LN1 and the straight line LN2, x indicated by the expression (11) becomes the x coordinate of the point K2. Accordingly, K2x that is the x coordinate of the point K2 can be obtained by the following expression (12).

[Math. 12]

$$K2x = S \tan(\pi/2 - \theta_p)/(\tan(\pi/2 - \theta_p) - \tan(\varphi)) \quad (12)$$

Further, by substituting K2x obtained in this manner, i.e., x indicated by the expression (11), into the expression (8) or the expression (9) described above, K2y that is the y coordinate of the point K2 can be obtained.

After the coordinates (K2x, K2y) of the point K2 are obtained, a distance from the point A to the point K2 depicted in FIG. 11 can be obtained.

In particular, the correction amount calculation unit 41 can obtain the coordinates of the point K2 (K2x, K2y) by calculating the expression (12) and the expression (8) or the expression (9) from, for example, focal length information, i.e., the focal length S, detection angle information, i.e., the inclination angle $\theta_p$, and the position of the point B31. It is to be noted that the angle $\varphi$ in the expression (8) or the expression (11) can be obtained from the focal length S, the position (coordinates) of the point B31, and the ratio between the pixel pitch of the display screen image of the display unit 26 and that of the imaging element IM11.

Further, the correction amount calculation unit 41 can obtain the distance AK11 on the basis of the obtained coordinates of the point K2 (K2x, K2y) and the relationship in size (ratio between the pixel pitches) between the display screen image (through image) of the display unit 26 and the imaging element IM11 and can further determine the position (coordinates) of the point B31' from the distance AK11 and the position (coordinates) of the point B31.

The correction amount calculation unit 41 can obtain the display position and the inclination θ of the boundary line BD61' as correction information from the position (coordinates) of the point B31' obtained in such a manner as described above and the inclination θ of the boundary line BD61 having been displayed till then.

It is to be noted that, although a case in which the rotation angle $\theta_r = 0$ is satisfied is described as an example, in a case where the rotation angle $\theta_r$ is not 0 degree, it is sufficient if the position (coordinates) of the point B31' is determined after coordinate conversion is performed.

In such a case as just described, the correction amount calculation unit 41 performs coordinate conversion of rotating the coordinate system of the display screen image of the display unit 26, i.e., rotating the coordinates of the point B31 and so forth by $-\theta_r$ such that the coordinates of the point B31 and so forth become the coordinates when the rotation angle $\theta_r = 0$ is satisfied, and determines the position of the point B31' using the post-coordinate correction coordinates.

Then, the correction amount calculation unit 41 performs, for the obtained coordinates of the point B31', coordinate conversion of rotating the coordinates by $\theta_r$ to obtain final coordinates of the point B31'. This makes it possible to obtain a correct display position and inclination θ of the post-display correction boundary line BD61'.

It is to be noted that it is also naturally possible to perform, in combination, any display correction among the display correction of a boundary line according to the rotation angle $\theta_r$, the display correction of a boundary line according to a change of the focal length information, and the display correction of a boundary line according to the inclination angle $\theta_p$ described above.

Further, after display correction of a boundary line between divisional regions is performed, the control unit 25 also corrects the position of the divisional regions in response to the correction of the display position and the inclination of the boundary line. In short, the display screen image (image) is divided into divisional regions in accordance with the post-display correction boundary line.

By performing display correction of a boundary line between divisional regions in such a manner as described above, even if the user rotates or inclines the imaging device 11 or performs a zoom operation, the display of the boundary is corrected without, in particular, the necessity of an operation by the user, and the divisional regions are also changed in accordance with the correction of the boundary line. Accordingly, the labor for setting of a boundary line, an imaging condition, and so forth by the user can be reduced, and convenience in use can be improved.

<Description of Setting Process>

A flow of processing performed by the imaging device 11 is described below.

For example, if operation for capturing of a recording image is started, then the imaging unit 22 receives and photoelectrically converts light incident from an imaging object through the imaging lens 21 to image the imaging object and supplies a captured image obtained as a result of the imaging to the control unit 25.

The captured image supplied from the imaging unit 22 is supplied from the display controlling unit 42 of the control unit 25 as a through image to the display unit 26 so as to be displayed. Further, in the case where display of overlapping display information such as a boundary line between divisional regions is also instructed, the display controlling unit 42 supplies the overlapping display information to the display unit 26 such that the overlapping display information is displayed in an overlapping relationship on the through image.

After the through image is displayed in this manner, the user would suitably perform setting relating to imaging or determine a composition of a recording image while watching the through image.

Figure 13:
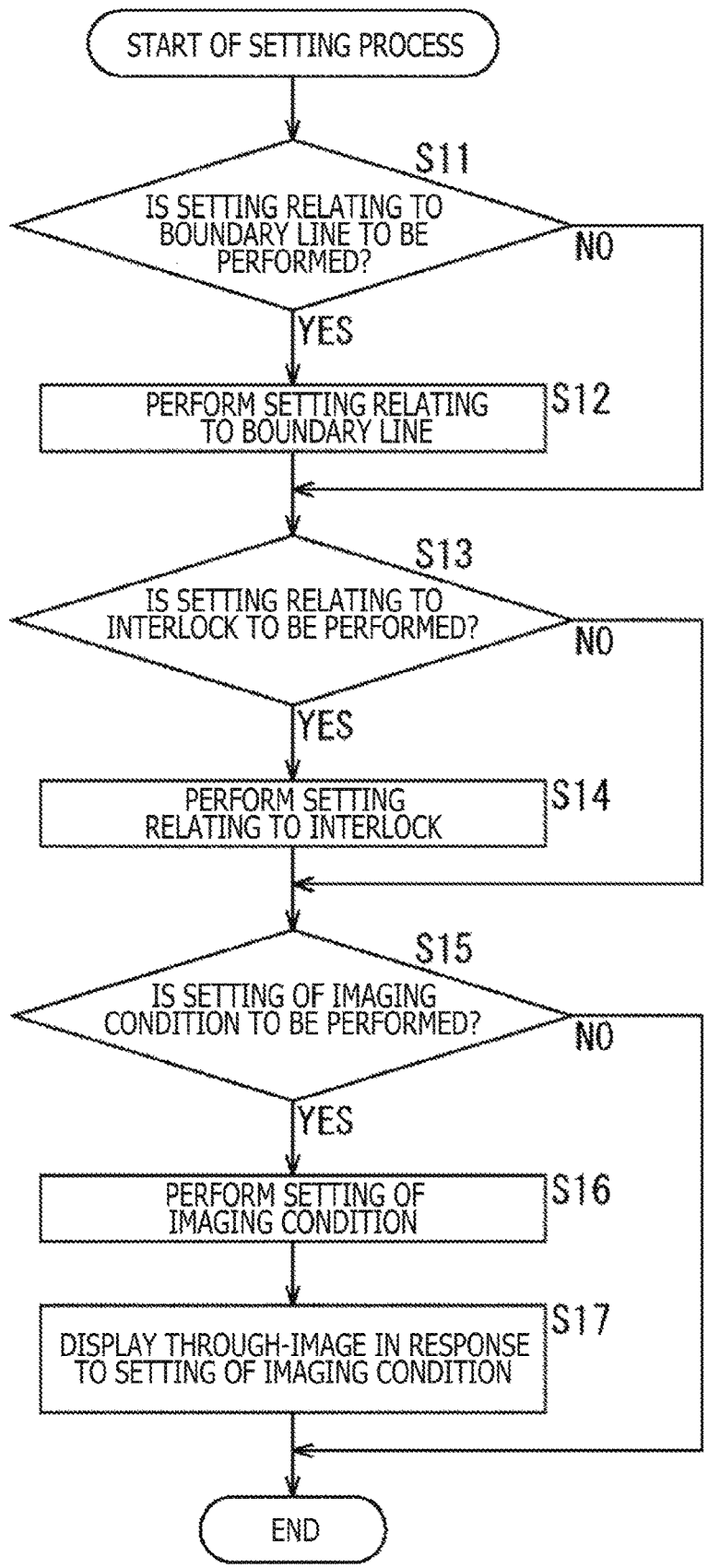
FIG. 13 is a flow chart illustrating a setting process.

For example, if some operation relating to setting such as setting relating to a boundary line between divisional images or setting of an imaging condition is performed by the user in a state in which a through image is displayed, then the imaging device 11 starts a setting process depicted in FIG. 13.

In the following, the setting process performed by the imaging device 11 is described with reference to a flow chart of FIG. 13.

In step S11, the control unit 25 decides on the basis of a signal supplied from the operation unit 27 whether or not setting relating to a boundary line is to be performed.

For example, in a case where the operation unit 27 is operated and setting of a new boundary line between divisional regions, setting of a display position or the like of the boundary line between divisional lines, setting relating to a blend region, or the like, is instructed by the user, and a signal according to the operation by the user is supplied from the operation unit 27 to the control unit 25, it is decided that setting relating to a boundary line is to be performed.

In a case where it is decided in step S11 that setting relating to a boundary line is not to be performed, a process in step S12 is skipped, and then the processing advances to step S13.

On the other hand, in a case where it is decided in step S11 that setting relating to a boundary line is to be performed, the control unit 25 performs, in step S12, setting relating to a boundary line in response to a signal supplied from the operation unit 27.

For example, in a case where division of the display screen image (through image) of the display unit 26 into several divisional regions with a new boundary line or lines is instructed by the user, the control unit 25 sets a new boundary line or lines and divisional regions in response to the operation by the user. The display controlling unit 42 controls the display unit 26 in accordance with the setting of the new boundary line or lines, i.e., in accordance with the setting of the divisional regions, to display the new boundary line or lines on the display screen image of the display unit 26.

Further, it is assumed that, for example, in a state in which the boundary line BD11 and the boundary line BD12 depicted in FIG. 2 are displayed, the user operates the wheel button, the cross key, or the like as the operation unit 27 to perform an operation for changing the display position, inclination, or the like of the boundary line BD11 or the boundary line BD12. In such a case as just described, the display controlling unit 42 controls the display unit 26 on the basis of the signal supplied from the operation unit 27 in response to the operation by the user and moves or inclines at least one boundary line from among the boundary lines.

At this time, it is also possible for the display controlling unit 42 to move a plurality of boundary lines between divisional regions simultaneously by an equal distance or to incline a plurality of boundary lines between divisional regions simultaneously by an equal angle, and to move or incline the boundary lines between divisional regions individually (independently of each other).

Further, for example, when the user operates the operation unit 27 to designate a width and so forth of a blend region, the control unit 25 changes the width and so forth of the blend region on the basis of a signal supplied from the operation unit 27 in response to the operation by the user. Also in regard to such blend regions, it is also possible for the control unit 25 to change the settings of the width and so forth of a plurality of blend regions in an interlocking relationship with each other and to change the setting individually (independently of each other).

In a case where the process in step S12 is performed or it is decided in step S11 that setting relating to a boundary line is not to be performed, the control unit 25 decides in step S13 and on the basis of a signal supplied from the operation unit 27 whether or not setting relating to interlocking is to be performed.

For example, in a case where the user operates the operation unit 27 to issue an instruction to the imaging device 11 to have the display screen image displayed upon interlocking setting depicted in FIG. 4 or to perform a selection operation of a check box or the like in a state in which the display screen image depicted in FIG. 4 is displayed, it is decided that setting relating to interlocking is to be performed.

Further, for example, in a case where interlocking of setting relating to movement of a boundary line or adjustment of an inclination or interlocking of setting relating to a width, a mixture ratio, and so forth of a blend region is instructed by the user, it is decided that setting relating to interlocking is to be performed.

In a case where it is decided in step S13 that setting relating to interlocking is not to be performed, a process in step S14 is skipped, and the processing thereafter advances to step S15.

On the other hand, in a case where it is decided in step S13 that processing relating to interlocking is to be performed, the control unit 25 performs in step S14 setting relating to interlocking in response to the signal supplied from the operation unit 27.

For example, in a case where, in a state in which the display screen image depicted in FIG. 4 is displayed on the display unit 26, the user operates the operation unit 27 to select a check box such as the check box CB11 or operate various buttons such as the button BT11, the control unit 25 performs setting relating to interlocking in response to the operation by the user.

In particular, for example, in a case where the user selects all the check boxes CB11 such that a check mark is displayed in the check boxes CB11, the control unit 25 causes the exposure correction values of divisional regions corresponding to the check boxes CB11 to be changed in an interlocking relationship with each other.

Further, for example, it is assumed that the user operates the operation unit 27 to select, in regard to movement of a display position or adjustment of an inclination of a boundary line between divisional regions by an operation by the user, such a setting that boundary lines between a plurality of divisional regions are changed simultaneously by an equal amount in an interlocking relationship with each other or such a setting that boundary lines between a plurality of divisional regions are changed individually (independently of each other).

In this case, the control unit 25 establishes, on the basis of a signal supplied from the operation unit 27 in response to the operation by the user, such a setting that boundary lines between a plurality of divisional regions are changed simultaneously by an equal amount in an interlocking relationship with each other or such a setting that boundary lines between a plurality of divisional regions are changed individually (independently of each other).

In a case where the process in step S14 is performed or it is decided in step S13 that setting relating to interlocking is not to be performed, a process in step S15 is performed.

In step S15, the control unit 25 decides on the basis of the signal supplied from the operation unit 27 whether or not setting of an imaging condition is to be performed.

For example, in a case where the user operates the operation unit 27 to instruct the imaging device 11 to perform changing of an imaging condition for one of a plurality of divisional regions or where a plurality of check boxes is selected and the process in step S14 is performed in a state in which the display screen image depicted in FIG. 4 is displayed, it is decided that setting of an imaging condition is to be performed.

In a case where it is decided in step S15 that setting of an imaging condition is not to be performed, processes in step S16 and step S17 are not performed, and the setting process is ended. In this case, a through image having been captured in accordance with an imaging condition similar to the previous one is displayed on the display unit 26.

On the other hand, in a case where it is decided in step S15 that setting of an imaging condition is to be performed, the control unit 25 performs in step S16 setting of an imaging condition for each divisional region in response to a signal supplied from the operation unit 27.

For example, in a case where the control unit 25 is instructed, on the basis of a signal supplied from the operation unit 27, to change the value of an item of an imaging condition such as a brightness or an aperture value of a designated divisional region, a shutter speed, an ISO sensitivity, or WB, the control unit 25 changes the value of the imaging condition of the divisional region.

At this time, when the setting is such that, in regard to an item subject to setting of an imaging condition, values (setting values) of the item of the imaging condition for the designated divisional region and those for other divisional regions are interlocked with each other, the control unit 25 sets not only the values of the item of the imaging condition for the designated divisional region but also the values of the item of the imaging condition for the other divisional regions set so as to interlock with the designated divisional region, to the value designated by the user.

Further, it is assumed that, for example, in a state in which the screen image depicted in FIG. 4 is selected, a plurality of check boxes relating to a predetermined item of an imaging condition is selected and the process in step S14 is performed. In this case, the control unit 25 changes the value of the predetermined item of the imaging condition for the divisional region corresponding to each selected check box to the value of the predetermined item of the imaging condition for the divisional region corresponding to a check box in the proximity of which a mark of a crown is applied among the check boxes.

In step S17, the display controlling unit 42 causes the display unit 26 to display a through image in response to the setting of the imaging condition.

At this time, the display controlling unit 42 causes, in regard to each of several divisional regions adjacent to each other that include at least a divisional region for which setting of an imaging condition has been performed last among the plurality of divisional regions, an image of a region corresponding to the divisional region of a captured image newly captured in accordance with the imaging condition set last, to be displayed as a through image.

Further, the display controlling unit 42 causes, in regard to another divisional region different from the divisional region in which the captured image newly captured in accordance with the imaging condition set last is displayed as a through image, an image of a region corresponding to the another divisional region of the captured image previously captured in accordance with the imaging condition set for the divisional region, to be displayed as a through image.

After a through image is displayed in this manner, the setting process is ended.

The imaging device 11 performs setting relating to a boundary line, setting relating to interlocking, setting of an imaging condition, and so forth in response to an operation by a user in such a manner as described above.

Consequently, the convenience in use of the imaging device 11 can be improved. In particular, if, for example, the positions of a plurality of boundary lines are moved at the same time, then the user can determine the positions of a plurality of boundary lines by single operation. Further, if the user performs interlocking setting, then the user can designate an imaging condition for a plurality of divisional regions by single operation.

<Description of Imaging Process>

Figure 14:
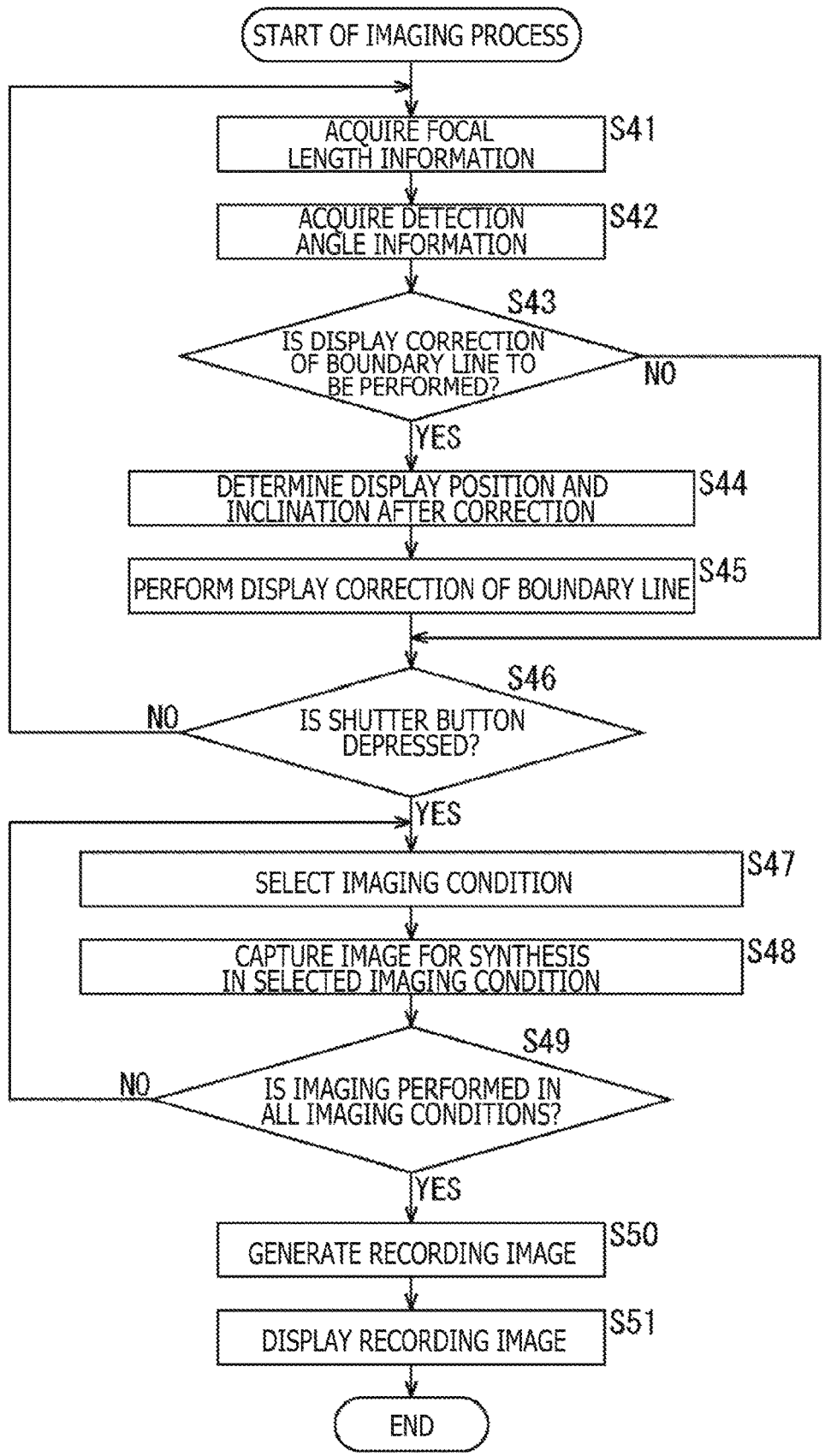
FIG. 14 is a flow chart illustrating an imaging process.

Further, in a state in which a through image is displayed on the display unit 26, the imaging device 11 also performs an imaging process for generating a recording image in response to an operation by a user. In the following, the imaging process performed by the imaging device 11 is described with reference to a flow chart of FIG. 14.

In step S41, the control unit 25 acquires focal length information from the lens information communication unit 23. In particular, the lens information communication unit 23 communicates with the imaging lens 21 to acquire focal length information from the imaging lens 21 and outputs the focal length information. The control unit 25 acquires the focal length information outputted from the lens information communication unit 23 in this manner.

In step S42, the control unit 25 acquires detection angle information from the angle detection unit 24.

In particular, the angle detection unit 24 detects a rotation angle $\theta_r$ and an inclination angle $\theta_p$ from an output of a gyro sensor or the like and outputs detection angle information indicative of a result of the detection. The control unit 25 acquires the detection angle information outputted from the angle detection unit 24 in this manner.

In step S43, the control unit 25 decides on the basis of the focal length information acquired in step S41 and the detection angle information acquired in step S42 whether or not display correction of a boundary line between divisional regions displayed on the display unit 26 is to be performed.

For example, in a case where at least one of the focal length indicated by the focal length information, the rotation angle $\theta_r$ indicated by the detection angle information, and the inclination angle $\theta_p$ indicated by the detection angle information changes, it is decided that display correction of a boundary line is to be performed. In particular, in a case where the value of any one of the focal length, rotation angle $\theta_r$, and inclination angle $\theta_p$ is different from the value when it was acquired in the preceding cycle, it is decided that display correction of a boundary line is to be performed.

Alternatively, for example, in a case where the focal length, inclination angle $\theta_p$, or rotation angle $\theta_r$, changes by a predetermined value or more from the value of the focal length, inclination angle $\theta_p$, or rotation angle $\theta_r$ corresponding to a boundary line between divisional regions displayed on the display unit 26 at the present point of time, it may be decided that display correction (change) of the boundary line is to be performed.

In such a case as just described, when the imaging device 11 is slightly rotated like when, for example, the rotation angle $\theta_r$ changes by 2 degrees, display correction of a boundary line is not performed, but when the imaging device 11 is rotated by somewhat great amount like when the rotation angle $\theta_r$ changes by 45 degrees or more, display correction of a boundary line is performed. As an alternative, for example, when the rotation angle $\theta_r$ changes by 90 degrees or more, i.e., when the imaging device 11 changes, for example, from a horizontally oriented state to a vertically oriented state, or when the imaging device 11 changes from a vertically oriented state to a horizontally orientated state, display correction of a boundary line may be performed.

In a case where it is decided in step S43 that display correction of a boundary line is not to be performed, processes in step S44 and step S45 are not performed, and thereafter, the processing advances to step S46.

On the other hand, in a case where it is decided in step S43 that display correction of a boundary line is to be performed, the processing advances to step S44.

In step S44, the correction amount calculation unit 41 determines a display position and an inclination of the post-correction boundary line between divisional regions, on the basis of the focal length information, detection angle information and the display position and the inclination $\theta$ of the boundary lines between the divisional regions at present. In particular, the correction amount calculation unit 41 suitably performs the processes described hereinabove with reference to FIGS. 6 to 12 to determine the display position and the inclination $\theta$ of the post-correction boundary lines as correction information.

In particular, for example, when the rotation angle $\theta_r$ changes, the correction amount calculation unit 41 determines the display position and the inclination of each post-correction boundary line between divisional regions by performing calculation of the expression (1) and so forth and determining the inclination $\theta'$ and the position of the point B11' as described hereinabove with reference to FIG. 6.

Further, for example, in a case where the focal length information changes, the correction amount calculation unit 41 performs calculation of the expression (7) and so forth and determines the position of the point B21' as described hereinabove with reference to FIGS. 7 to 9 to thereby determine the display position and the inclination of the post-correction boundary line between divisional regions.

Furthermore, for example, in a case where the inclination angle $\theta_p$ changes, the correction amount calculation unit 41 determines a display position and an inclination of a post-correction boundary line between divisional regions as correction information by performing calculation of the expression (12), expression (8), or the like and determining the position of the point B31' as described hereinabove with reference to FIGS. 10 to 12.

In step S45, the display controlling unit 42 controls the display unit 26 on the basis of the display position and the inclination of the post-correction boundary line between divisional regions determined in step S44, i.e., on the basis of the correction information, to perform display correction of the boundary line between divisional regions.

In particular, the display controlling unit 42 updates the display of the boundary line between divisional regions as overlapping display information such that the boundary line between divisional regions is displayed with the inclination determined in step S45 at the display position determined in step S45 on the display screen image of the display unit 26. By this, the display position and the inclination of the boundary line between divisional regions are corrected such that a relative positional relationship between the imaging object on the through image and the boundary line between divisional regions as the overlapping display information is maintained.

In step S44 and step S45, when other overlapping display information such as a boundary line between divisional regions of a blend region is also displayed, in addition to the boundary line between divisional regions, correction information of the overlapping display information is also determined, and display correction of the overlapping display information is performed on the basis of the correction information obtained.

Further, for example, in a case where display correction of other overlapping display information different from the boundary line between divisional regions is to be performed, the display position of the post-correction other overlapping display information indicated by the correction information sometimes comes to a position outside the display screen image of the display unit 26, i.e., to a position outside the through image.

In such a case as just described, the display controlling unit 42 controls the display of the other overlapping display information on the display unit 26 such that the other overlapping display information is displayed at a position that is a position in the display screen image (through image) and is nearest to the display position of the other overlapping display information indicated by the correction information. In other words, the other overlapping display information is displayed at a position in the proximity of the position indicated by the correction information in the display screen image (through image) of the display unit 26.

After the display correction of the boundary line between divisional regions is performed, the processing advances to step S46.

In a case where the process in step S45 is performed or it is decided in step S43 that display correction of a boundary line is not to be performed, the control unit 25 decides in step S46 whether or not the shutter button as the operation unit 27 is depressed.

In a case where it is decided in step S46 that the shutter button is not depressed, the processing returns to step S41, and the processes described above are performed repetitively.

On the other hand, in a case where it is decided in step S46 that the shutter button is depressed, the control unit 25 selects in step S47 one imaging condition from among a plurality of imaging conditions determined for a plurality of divisional regions.

In particular, by the process in step S16 of FIG. 13, an imaging condition is determined for each of the plurality of divisional regions, and the control unit 25 selects the imaging conditions in order as an imaging condition for a processing target.

In step S48, the control unit 25 controls the imaging unit 22 and the imaging lens 21 to capture a captured image to be used as an image for synthesis in accordance with the imaging condition selected in step S47.

In particular, the control unit 25 controls the aperture of the imaging lens 21 such that an aperture value of the selected imaging condition is satisfied and controls the imaging unit 22 to capture a captured image with brightness, a shutter speed, an ISO sensitivity, and so forth of the selected imaging condition. Then, the control unit 25 performs, for the captured image supplied from the imaging unit 22, white balance adjustment with a type of WB and a color temperature of the selected imaging condition to generate an image for synthesis.

In step S49, the control unit 25 decides whether or not imaging is completed in accordance with all imaging conditions.

In a case where it is decided in step S49 that imaging is not completed in accordance with all imaging conditions, the processing returns to step S47 and the processes described above are performed repetitively. In particular, capture of an image for synthesis is performed in accordance with an imaging condition that is yet to be selected as a processing target.

On the other hand, in a case where it is decided in step S49 that imaging has been performed in accordance with all imaging conditions, since images for synthesis in the imaging conditions set for the individual divisional regions are obtained, the processing advances to step S50.

In step S50, the control unit 25 generates a recording image on the basis of the images for synthesis captured in accordance with the imaging conditions.

In particular, the control unit 25 cuts out a portion of a divisional region corresponding to an imaging condition in accordance with which each image for synthesis is captured from among the images for synthesis to form a cutout image and lines up such cutout images to form one recording image. At this time, the control unit 25 performs, for boundary line portions between the cutout images, the abovementioned blend process in accordance with the setting relating to the blend region determined by the process in step S12 of FIG. 13 and connects the cutout images.

It is to be noted that, although an example is described here in which setting of divisional regions and blend regions is performed before capturing images for synthesis, setting of divisional regions and blend regions, i.e., determination of a position and an inclination of each boundary line between divisional regions, and a width and a mixture ratio of blend regions may be determined after capturing images for synthesis. Also in such a case as just described, since images for synthesis captured in accordance with individual imaging conditions are available, it is possible to obtain a recording image according to the settings of divisional regions and blend regions.

In step S51, the display controlling unit 42 supplies the obtained recording image to the display unit 26 so as to be displayed, and the imaging process ends therewith. Further, the control unit 25 supplies the recording image to the image recording unit 28 so as to be recorded.

In this manner, the imaging device 11 performs display correction of boundary lines between divisional regions and so forth in response to focal length information and detection angle information and generates a recording image on the basis of the images for synthesis captured.

By performing display correction of boundary lines between divisional regions and so forth in response to focal length information and detection angle information in this manner, the necessity for the user to perform setting relating to a boundary line every time the user rotates the imaging device 11 or changes the focal length is eliminated, and the convenience in use of the imaging device 11 can be improved.

<Example of Configuration of Computer>

Incidentally, while the series of processes described above can be executed by hardware, it may otherwise be executed by software. In a case where the series of processes is executed by software, a program that constructs the software is installed into a computer. Here, as the computer, a computer incorporated in hardware for exclusive use, a personal computer, for example, for universal use that can execute various functions by installing various programs, and so forth are included.

FIG. 15 is a block diagram depicting an example of a configuration of hardware of a computer that executes the abovementioned series of processes in accordance with a program.

In the computer, a CPU (Central Processing Unit) 501, a ROM (Read Only Memory) 502, and a RAM (Random Access Memory) 503 are connected to each other by a bus 504.

To the bus 504, an input/output interface 505 is further connected. To the input/output interface 505, an inputting unit 506, an outputting unit 507, a recording unit 508, a communication unit 509, and a drive 510 are connected.

The inputting unit 506 includes a keyboard, a mouse, a microphone, an imaging element, and so forth. The outputting unit 507 includes a display, a speaker, and so forth. The recording unit 508 includes a hard disk, a nonvolatile memory, and so forth. The communication unit 509 includes a network interface or the like. The drive 510 drives a removable recording medium 511 such as a magnetic disk, an optical disk, a magneto-optical disk, a semiconductor memory, or the like.

In the computer configured in such a manner as described above, the CPU 501 loads a program recorded, for example, in the recording unit 508 into the RAM 503 through the input/output interface 505 and the bus 504 and executes the program to perform the series of processes described above.

The program that is executed by the computer (CPU 501) can, for example, be provided by being recorded into the removable recording medium 511 as a package medium or the like. Further, the program can be provided through a wired or wireless transmission medium such as a local area network, the Internet, a digital satellite broadcast, or the like.

In the computer, a program can be installed into the recording unit 508 through the input/output interface 505 by mounting a removable recording medium 511 on the drive 510. Further, the program can be received by the communication unit 509 through a wired or wireless transmission medium and installed into the recording unit 508. Further, the program can be installed in advance into the ROM 502 or the recording unit 508.

It is to be noted that the program executed by the computer may be a program in which processes are performed in a time series in accordance with the order described herein or may be a program in which processes are executed in parallel or at a necessary timing such as when the program is called.

Further, the embodiment of the present technology is not limited to the embodiment described hereinabove, and various alterations are possible without departing from the subject matter of the present disclosure.

For example, the present technology can assume a configuration for cloud computing in which one function is shared and processed cooperatively by a plurality of devices through a network.

Further, the steps described hereinabove in connection with the flow charts can be executed by sharing by a plurality of devices, in addition to being executed by a single device.

Furthermore, where one step includes a plurality of processes, the plurality of processes included in the one step can be executed by sharing by a plurality of devices, in addition to being executed by a single device.

It is to be noted that the present technology can assume such a configuration as described below.

(1)

An image processing device, including:

a display controlling unit that causes, while taking, as cutout images, regions different from each other in a plurality of images for synthesis whose imaging conditions are different from each other, a boundary line, which relates to a blend process to be performed when a plurality of the cutout images is synthesized to generate a recording image, to be displayed and causes the displaying of at least one of the boundary lines from among a plurality of the boundary lines to be changed in response to an operation by a user.

(2)

The image processing device according to (1) above, in which the display controlling unit moves a display position of the boundary line or inclines the boundary line in response to an operation by the user.

(3)

The image processing device according to (1) or (2) above, in which the display controlling unit changes a plurality of the boundary lines simultaneously by an equal amount.

(4)

The image processing device according to any one of (1) to (3) above, further including:

a control unit that sets whether the plurality of the boundary lines is to be changed independently of each other or the plurality of the boundary lines is to be changed simultaneously by an equal amount.

(5)

The image processing device according to any one of (1) to (4) above, in which the image processing device is an imaging device; and the display controlling unit causes the boundary line to be displayed in an overlapping relationship with an image captured through an imaging lens of the imaging device.

(6)

The image processing device according to (5) above, in which the display controlling unit changes the boundary line on the basis of at least one of focal length information indicative of a focal length of the imaging lens and detection angle information indicative of a rotation angle of the imaging device.

(7)

The image processing device according to (6) above, in which the display controlling unit changes a display position and an inclination of the boundary line such that a relative positional relationship between an imaging object on the image and the boundary line is maintained.

(8)

The image processing device according to (6) or (7) above, in which the display controlling unit changes the boundary line where the rotation angle changes by a predetermined value or more.

(9)

The image processing device according to any one of (5) to (8) above, in which the image is a through image.

(10)

The image processing device according to (4) above, in which the control unit changes setting of a plurality of blend regions, which becomes a target of the blend process, in an interlocking relationship with each other.

(11)

An image processing method, including the step of:

causing, while taking, as cutout images, regions different from each other in a plurality of images for synthesis whose imaging conditions are different from each other, a boundary line, which relates to a blend process to be performed when a plurality of the cutout images is synthesized to generate a recording image, to be displayed and causing the displaying of at least one of the boundary lines from among a plurality of the boundary lines to be changed in response to an operation by a user.

(12)

A program for causing a computer to execute a process including the step of:

causing, while taking, as cutout images, regions different from each other in a plurality of images for synthesis whose imaging conditions are different from each other, a boundary line, which relates to a blend process to be performed when a plurality of the cutout images is synthesized to generate a recording image, to be displayed and causing the displaying of at least one of the boundary lines from among a plurality of the boundary lines to be changed in response to an operation by a user.

(13)

An imaging device, including:

a display controlling unit that changes overlapping display information to be displayed in an overlapping relationship with an image captured through an imaging lens of the imaging device, on the basis of at least one of focal length information indicative of a focal length of the imaging lens and detection angle information indicative of a rotation angle of the imaging device.

(14)

The imaging device according to (13) above, in which the display controlling unit changes a display position and an inclination of the overlapping display information such that a relative positional relationship between an imaging object on the image and the overlapping display information is maintained.

(15)

The imaging device according to (13) or (14), in which the image is a through image.

(16)

The imaging device according to any one of (13) to (15) above, in which the overlapping display information is information including a boundary line that divides the image into a plurality of divisional regions.

(17)

The imaging device according to (16) above, in which the display controlling unit moves the display position of the overlapping display information or inclines the overlapping display information, in response to an operation by a user.

(18)

The imaging device according to (17) above, in which the display controlling unit moves a plurality of the overlapping display information simultaneously by an equal amount or inclines a plurality of the overlapping display information simultaneously by an equal amount, in response to an operation by a user.

(19)

The imaging device according to any one of (16) to (18) above, further including:

a control unit that sets an imaging condition for each of the plurality of the divisional regions.

(20)

The imaging device according to (19) above, in which the control unit changes, in regard to two or more of the divisional regions designated by a user, setting values of a predetermined item of the imaging conditions individually corresponding to the two or more of the divisional regions.

(21)

The imaging device according to (20) above, in which the display controlling unit further causes an icon, which represents the two or more of the divisional regions between which the predetermined item interlocks, to be displayed.

(22)

The imaging device according to any one of (19) to (21) above, in which the display controlling unit causes, where a through image is to be displayed as the image, an image captured in accordance with the imaging condition corresponding to a predetermined one of the divisional regions to be displayed as an image of the predetermined one of the divisional regions of the through image and causes an image captured in accordance with the imaging condition corresponding to other divisional regions different from the predetermined one of the divisional regions to be displayed as an image of the other divisional regions.

(23)

The imaging device according to any one of (19) to (22) above, in which the control unit causes an image for synthesis to be captured for each of a plurality of the imaging conditions and synthesizes, while taking, as a cutout image, the divisional region of the image for synthesis corresponding to the imaging condition when the image for synthesis is captured, a plurality of the cutout images to generate a recording image.

(24)

The imaging device according to (23) above, in which the overlapping display information is information including a blend region boundary line indicative of a blend region for which a blend process is to be performed when the cutout images are synthesized.

(25)

The imaging device according to (24) above, in which the control unit changes setting relating to a plurality of the blend regions in an interlocking relationship.

(26)

The imaging device according to any one of (13) to (25) above, in which the display controlling unit changes the overlapping display information where the rotation angle changes by a predetermined value or more.

(27)

The imaging device according to any one of (13) to (26) above, in which, where a display position of the overlapping display information after change is a position outside the image, the display controlling unit causes the overlapping display information to be displayed in a proximity of the display position in the image.

(28)

An imaging processing method, including the step of: changing overlapping display information to be displayed in an overlapping relationship with an image captured through an imaging lens of an imaging device, on the basis of at least one of focal length information indicative of a focal length of the imaging lens and detection angle information indicative of a rotation angle of the imaging device.

(29)

A program for causing a computer to execute a process including the step of: changing overlapping display information to be displayed in an overlapping relationship with an image captured through an imaging lens of an imaging device, on the basis of at least one of focal length information indicative of a focal length of the imaging lens and detection angle information indicative of a rotation angle of the imaging device.

REFERENCE SIGNS LIST

11 Imaging device, 21 Imaging lens, 22 Imaging unit, 23 Lens information communication unit, 24 Angle detection unit, 25 Control unit, 26 Display unit, 27 Operation unit, 41 Correction amount calculation unit, 42 Display controlling unit

The invention claimed is:

1. An image processing device, comprising:
a central processing unit (CPU) configured to:
control a display of a plurality of boundary lines that corresponds to a plurality of regions, wherein
each of the plurality of regions is different,
the plurality of regions corresponds to a plurality of first images cutout from a plurality of second images for synthesis,
an imaging condition of each of the plurality of second images is different, and
a boundary line of the plurality of boundary lines relates to a blend process to be performed when the plurality of first images is synthesized to generate a recording image; and
concurrently change, based on a first operation by a user, the display of the plurality of boundary lines by a specific amount.

2. The image processing device according to claim 1, wherein
the CPU is further configured to one of
move a display position of the boundary line based on a second operation by the user, or
incline the boundary line based on the second operation by the user.

3. The image processing device according to claim 1, wherein the CPU is further configured to set a mode to concurrently change the display of the plurality of the boundary lines by an equal amount.

4. The image processing device according to claim 3, wherein
the CPU is further configured to change a setting of a plurality of blend regions,
the plurality of blend regions is in an interlocking relationship, and
the plurality of blend regions corresponds to a target of the blend process.

5. The image processing device according to claim 1, wherein
the image processing device is an imaging device that includes an imaging lens, and
the CPU is further configured to change the display of the boundary line to enable overlap of the boundary line with an image captured through the imaging lens.

6. The image processing device according to claim 5, wherein
the CPU is further configured to change the boundary line based on at least one of focal length information indicative of a focal length of the imaging lens or detection angle information indicative of a rotation angle of the imaging device.

7. The image processing device according to claim 6, wherein
the CPU is further configured to change each of a display position and an inclination of the boundary line to maintain a relative positional relationship between an imaging object on the image and the boundary line.

8. The image processing device according to claim 6, wherein
the CPU is further configured to change the boundary line based on a change of the rotation angle by at least a specific value.

9. The image processing device according to claim 5, wherein the image is a through image.

10. An image processing method, comprising:
controlling a display of a plurality of boundary lines that corresponds to a plurality of regions, wherein
each of the plurality of regions is different,
the plurality of regions corresponds to a plurality of first images cutout from a plurality of second images for synthesis,
an imaging condition of each of the plurality of second images is different, and
a boundary line of the plurality of boundary lines relates to a blend process to be performed when a plurality of first images is synthesized to generate a recording image; and concurrently changing, based on an operation by a user, the display of the plurality of boundary lines by a specific amount.

11. A non-transitory computer-readable medium having stored thereon computer-executable instructions that, when executed by an image processing device, cause the image processing device to execute operations, the operations comprising:
controlling a display of a plurality of boundary lines that corresponds to a plurality of regions, wherein
each of the plurality of regions is different,
the plurality of regions corresponds to a plurality of first images cutout from a plurality of second images for synthesis,
an imaging condition of each of the plurality of second images is different, and
a boundary line of the plurality of boundary lines relates to a blend process to be performed when a plurality of first images is synthesized to generate a recording image; and
concurrently changing, based on an operation by a user, the display of the plurality of boundary lines by a specific amount.

12. An imaging device, comprising:
an imaging lens through which an image is captured; and
a central processing unit (CPU) configured to change a display of overlapping display information that is in an overlapping relationship with the image captured through the imaging lens, wherein
the display of the overlapping display information is changed based on focal length information indicative of a focal length of the imaging lens and detection angle information indicative of a rotation angle of the imaging device, and
the rotation angle is an angle of rotation of the imaging device around an optical axis of the imaging lens.

13. The imaging device according to claim 12, wherein the CPU is further configured to change each of a display position and an inclination of the overlapping display information to maintain a relative positional relationship between an imaging object on the image and the overlapping display information.

14. The imaging device according to claim 12, wherein the image is a through image.

15. The imaging device according to claim 12, wherein the overlapping display information is information including a boundary line that divides the image into a plurality of divisional regions.

16. The imaging device according to claim 15, wherein the CPU is further configured to one of
move a display position of the overlapping display information based on a first operation by a user, or
incline the overlapping display information based on the first operation.

17. The imaging device according to claim 16, wherein the CPU is further configured to one of
concurrently move, based on a second operation of the user, a plurality of the overlapping display information by an equal amount, or
concurrently incline, based on the second operation by the user, a plurality of the overlapping display information by the equal amount.

18. The imaging device according to claim 15, wherein the CPU is further configured to set an imaging condition for each of the plurality of divisional regions.

19. The imaging device according to claim 18, wherein the CPU is further configured to change, based on at least two divisional regions of the plurality of divisional regions, setting values of a specific item of the imaging condition individually corresponding to the at least two divisional regions.

20. The imaging device according to claim 19, wherein
the CPU is further configured to control a display of an icon, and
the icon represents the at least two divisional regions between which the specific item of the imaging condition is interlocked.

21. The imaging device according to claim 18, wherein the CPU is further configured to:
control a display of a through image as a first image;
control a display of a second image captured based on the imaging condition that corresponds to a specific divisional region of the plurality of divisional regions, wherein the second image is displayed as an image of the specific divisional region of the through image; and
control a display of a third image captured based on the imaging condition that corresponds to divisional regions of the plurality of divisional regions different from the specific divisional region.

22. The imaging device according to claim 18, wherein the CPU is further configured to:
control capture of a specific image for synthesis for each of a plurality of imaging conditions; and
synthesize a plurality of cutout images to generate a recording image, wherein
each cutout image of the plurality of cutout images corresponds to a respective divisional region of the plurality of divisional regions of the specific image, and
the specific image corresponds to the imaging condition of the plurality of imaging conditions.

23. The imaging device according to claim 22, wherein
the overlapping display information is information including a blend region boundary line indicative of a blend region of a plurality of blend regions,
the CPU is further configured to execute a blend process for the blend region at a time of synthesis of the plurality of cutout images.

24. The imaging device according to claim 23, wherein
the CPU is further configured to change a setting relating to the plurality of the blend regions, and
the plurality of blend regions is in an interlocking relationship.

25. The imaging device according to claim 12, wherein the CPU is further configured to change the overlapping display information based on change in the rotation angle by at least a specific value.

26. The imaging device according to claim 12, wherein the CPU is further configured to control, based on a display position of the overlapping display information is a position outside the image, the display of the overlapping display information in a proximity of the display position in the image.

27. An imaging processing method, comprising:
changing a display of overlapping display information that is in an overlapping relationship with an image captured through an imaging lens of an imaging device, wherein
the display of the overlapping display information is changed based on focal length information indicative of a focal length of the imaging lens and detection angle information indicative of a rotation angle of the imaging device, and the rotation angle is an angle of rotation of the imaging device around an optical axis of the imaging lens.

28. A non-transitory computer-readable medium having stored thereon computer-executable instructions that, when executed by an image processing device, cause the image processing device to execute operations, the operations comprising:

changing a display of overlapping display information that is in an overlapping relationship with an image captured through an imaging lens of an imaging device, wherein the display of the overlapping display information is changed based on focal length information indicative of a focal length of the imaging lens and detection angle information indicative of a rotation angle of the imaging device, and the rotation angle is an angle of rotation of the imaging device around an optical axis of the imaging lens.

* * * * *